US012801674B2

(12) United States Patent
Guillon et al.

(10) Patent No.: US 12,801,674 B2
(45) Date of Patent: Nov. 17, 2026

(54) SYSTEM, METHOD AND APPARATUS FOR REAL TIME INTERNET SEARCHING USING LARGE LANGUAGE MODELS

(71) Applicant: AMADEUS S.A.S., Biot (FR)

(72) Inventors: Nicolas Guillon, Mougins (FR); Yves Grealou, Antibes (FR); Alex Prengere, Antibes (FR); Alexis Ravanel, Antibes (FR); Massimiliano Pronesti, Vallauris (FR); Raul Buibas, Cagnes-sur-Mer (FR); Come Demolliere, Antibes (FR); Xhesiand Topalli, Antibes (FR); Corina Ispas, Biot (FR); Yannick Devaux, Saint-Genis Pouilly (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/642,288

(22) Filed: Apr. 22, 2024

(65) Prior Publication Data

US 2024/0370509 A1 Nov. 7, 2024

Related U.S. Application Data

(60) Provisional application No. 63/463,146, filed on May 1, 2023.

(51) Int. Cl.
*G06F 16/9532* (2019.01)
*G06F 16/901* (2019.01)
(Continued)

(52) U.S. Cl.
CPC ...... *G06F 16/9532* (2019.01); *G06F 16/9024* (2019.01); *G06F 16/9536* (2019.01);
(Continued)

(58) Field of Classification Search
None
See application file for complete search history.

(56) References Cited

U.S. PATENT DOCUMENTS

| | | | |
|---|---|---|---|
| 6,886,009 | B2 | 4/2005 | Jeng et al. |
| 7,467,131 | B1 | 12/2008 | Gharachorloo et al. |

(Continued)

FOREIGN PATENT DOCUMENTS

| | | | |
|---|---|---|---|
| CN | 116680093 | A | 9/2023 |
| EP | 2657893 | A1 | 10/2013 |

(Continued)

OTHER PUBLICATIONS

Zhou, Denny, et al. “Least-to-most prompting enables complex reasoning in large language models.” arXiv preprint arXiv:2205.10625 (2022).

(Continued)

*Primary Examiner* — Giuseppi Giuliani
(74) *Attorney, Agent, or Firm* — Perry + Currier Inc.

(57) ABSTRACT

The present specification provides, amongst other things, a novel system, method and apparatus for real time travel searches. Certain implementations contemplate a collaboration platform that can receive a natural language query from an electronic platform that includes unstructured travel search queries. The collaboration engine cooperates with a large language model engine to generate a natural language response and structured queries from the unstructured queries. The structured queries are sent to travel actor engines. Itinerary responses from the travel actor engines are substituted for the structured query by the collaboration platform, so that the natural language response along with the itinerary responses are sent back to the electronic device.

18 Claims, 15 Drawing Sheets

(51) Int. Cl.

| | |
|---|---|
| ***G06F 16/9536*** | (2019.01) |
| ***G06F 40/35*** | (2020.01) |
| ***G06N 3/006*** | (2023.01) |
| ***G06N 3/0455*** | (2023.01) |
| ***G06N 3/0895*** | (2023.01) |

(52) U.S. Cl.
CPC ............. *G06F 40/35* (2020.01); *G06N 3/006* (2013.01); *G06N 3/0455* (2023.01); *G06N 3/0895* (2023.01)

(56) References Cited

U.S. PATENT DOCUMENTS

| | | | | |
|---|---|---|---|---|
| 7,974,971 | B2 | 7/2011 | Lu et al. | |
| 9,318,108 | B2 | 4/2016 | Gruber et al. | |
| 9,426,111 | B1 | 8/2016 | Ross | |
| 9,569,537 | B2 | 2/2017 | Barak et al. | |
| 10,776,189 | B2 | 9/2020 | Bucchi et al. | |
| 11,056,107 | B2 | 7/2021 | Nahamoo et al. | |
| 11,271,803 | B2 | 3/2022 | Cartaya et al. | |
| 11,782,961 | B2 | 10/2023 | Blaya et al. | |
| 12,524,465 | B2 | 1/2026 | Fieldman | |
| 12,632,491 | B1 | 5/2026 | Yu et al. | |
| 2006/0265361 | A1 | 11/2006 | Chu | |
| 2008/0140466 | A1 | 6/2008 | dE Marcken | |
| 2009/0150343 | A1 | 6/2009 | English et al. | |
| 2009/0150387 | A1 | 6/2009 | Marchewitz | |
| 2011/0208715 | A1 | 8/2011 | Ni et al. | |
| 2013/0031113 | A1* | 1/2013 | Feng | G06F 16/243 707/E17.014 |
| 2013/0080447 | A1 | 3/2013 | Ramer et al. | |
| 2013/0275164 | A1 | 10/2013 | Gruber et al. | |
| 2014/0278597 | A1 | 9/2014 | Wilkinson et al. | |
| 2017/0132536 | A1 | 5/2017 | Goldstein et al. | |
| 2018/0007448 | A1* | 1/2018 | Gupta | H04N 21/4622 |
| 2019/0019160 | A1 | 1/2019 | Champaneria | |
| 2019/0370270 | A1 | 12/2019 | Rezaei et al. | |
| 2020/0042334 | A1 | 2/2020 | Radebaugh et al. | |
| 2020/0412767 | A1 | 12/2020 | Crabtree et al. | |
| 2021/0166160 | A1 | 6/2021 | Ptitsyn et al. | |
| 2021/0174419 | A1 | 6/2021 | Van De Woestyne et al. | |
| 2021/0382925 | A1 | 12/2021 | Fincun et al. | |
| 2021/0409204 | A1 | 12/2021 | Wronski et al. | |
| 2022/0004567 | A1 | 1/2022 | Tao et al. | |
| 2022/0004718 | A1 | 1/2022 | Quamar et al. | |
| 2022/0171820 | A1 | 6/2022 | Neun et al. | |
| 2023/0087667 | A1 | 3/2023 | Dash et al. | |
| 2023/0137350 | A1 | 5/2023 | Todoroki | |
| 2023/0208840 | A1 | 6/2023 | Venable | |
| 2023/0325725 | A1* | 10/2023 | Lester | G06N 3/0455 |
| 2023/0367973 | A1* | 11/2023 | Konam | G06F 40/134 |
| 2024/0020019 | A1 | 1/2024 | Zaydman et al. | |
| 2024/0111960 | A1 | 4/2024 | Earle et al. | |
| 2024/0135472 | A1 | 4/2024 | Jafri et al. | |
| 2024/0193445 | A1* | 6/2024 | Dong | G06N 5/043 |
| 2024/0194180 | A1 | 6/2024 | Goldshtein et al. | |
| 2024/0195841 | A1 | 6/2024 | Crabtree et al. | |
| 2024/0320433 | A1* | 9/2024 | Lott | G06F 40/284 |
| 2024/0330993 | A1* | 10/2024 | Al-Qurishi | G06F 40/20 |
| 2024/0346256 | A1* | 10/2024 | Qin | G06F 40/216 |
| 2024/0354346 | A1* | 10/2024 | Lott | G06F 40/284 |
| 2024/0370432 | A1 | 11/2024 | Devaux et al. | |
| 2024/0428316 | A1 | 12/2024 | Chambers et al. | |
| 2025/0005072 | A1 | 1/2025 | Salowitz et al. | |
| 2025/0173632 | A1 | 5/2025 | Evans et al. | |
| 2025/0181998 | A1 | 6/2025 | Lorente Paramo et al. | |
| 2025/0307897 | A1 | 10/2025 | Nadav et al. | |
| 2025/0342408 | A1 | 11/2025 | Reyes et al. | |
| 2026/0050844 | A1 | 2/2026 | Reyes | |
| 2026/0133812 | A1 | 5/2026 | Subramaniyan | |
| 2026/0134397 | A1 | 5/2026 | Hui-Bon-Hoa | |

FOREIGN PATENT DOCUMENTS

| | | | |
|---|---|---|---|
| EP | 4617902 | A1 | 9/2025 |
| EP | 4617903 | A1 | 9/2025 |
| EP | 4675461 | A1 | 1/2026 |

OTHER PUBLICATIONS

Schick, Timo, et al. "Toolformer: Language models can teach themselves to use tools." Advances in Neural Information Processing Systems 36 (2024).

Paranjape, Bhargavi, et al. "Art: Automatic multi-step reasoning and tool-use for large language models." arXiv preprint arXiv:2303.09014 (2023).

Snell, Charlie, et al. "Context-aware language modeling for goal-oriented dialogue systems." arXiv preprint arXiv:2204.10198 (2022).

Kashyap, Dilip, "Exploring the Capabilities of the ChatGPT API: A Beginner's Guide", Jan. 18, 2023, Level Up Coding.

Arigbabu, Olasimbo, "Preventing Conversation Drift in LLM-based Chatbots Using ChatGPT", Mar. 15, 2023, Better Programming.

Shin, Jamin, et al. "Dialogue summaries as dialogue states (DS2), template-guided summarization for few-shot dialogue state tracking." arXiv preprint arXiv:2203.01552 (2022).

Shuster, Kurt, et al. "Blenderbot 3: a deployed conversational agent that continually learns to responsibly engage." arXiv preprint arXiv:2208.03188 (2022).

Anonymous, "ChatGPT plugins OpenAI", Mar. 23, 2023, openai.com, Retrieved from the Internet at URL: https://openai.com/index/chatgpt-plugins/.

Kayak, "Cheap Flights", with English translation, kayak.fr, 2024, Retrieved from the Internet on Jul. 30, 2024 fro URL: https://www.kayak.fr/flights?fid=&adults=1&cabin=e&return_date=21%2F01%2F2024&return_time=a&oneway=n&depart_date=14%2F01%2F2024&depart_time=a&origincode=LHR%2F28501&origin=LHR&destcode=NRT%2F21033&destination=NRT&action=doflights&errorOccurred=true.

U.S. Appl. No. 18/529,228, System, Method and Apparatus for Network Search Including a Chatbot, filed Dec. 5, 2023.

U.S. Appl. No. 18/596,801, System, Method and Apparatus for Network Search Including a Chatbot, filed Mar. 6, 2024.

U.S. Appl. No. 18/651,096, System, Method and Apparatus for Network Search with Caching, filed Apr. 30, 2024.

U.S. Appl. No. 18/650,903, System and Method for Dynamic Query Management Using Meta-Descriptions in a Conversational Search Engine, filed Apr. 30, 2024.

Frenette, Joel, "Enhancing Travel Agent Productivity with Ethical AI: Workflow Automation without Losing the Human Touch." IJPREMS, vol. 1, Issue 1, pp. 1-14 (Jan. 2015), Retrieved from https://zenodo.org/records/16457346)( Year: 2015).

* cited by examiner

SYSTEM, METHOD AND APPARATUS FOR REAL TIME INTERNET SEARCHING USING LARGE LANGUAGE MODELS

PRIORITY CLAIM

The present specification claims priority from U.S. Provisional Patent Application 63/463,146, filed May 1, 2023, the contents of which are incorporated herein by reference.

FIELD

The present disclosure generally relates to network computing and more particularly to real-time searches over the network.

BACKGROUND

Large language models (LLM) are rapidly transforming the state of the art for computing, including network searching. However, the amount of processing complexity for and LLM is staggering and can lead to hallucination and/or extraordinary intensive computational and network requirements.

SUMMARY

An aspect of the specification provides a method for real-time search including: configuring a large language model (LLM) engine with a context shift using a plurality of specific contextualization objects within a hierarchy dependent from a general contextualization object; receiving, at a natural language processing (NLP) engine, an input message; forwarding the input message from the collaboration platform to the LLM engine; determining, at the LLM engine, that the input message includes an unstructured query corresponding to one of the specific contextualization objects based on the general context shift and the unstructured query; the number of tokens in the determining being less than if the determining is based on a non-hierarchical contextualization object; preparing, at the LLM engine, a draft response message including a structured query to at least one of a plurality of search engines corresponding to the one of the specific contextualization objects; forwarding the draft response message from the LLM engine to the collaboration platform; sending the structured query from the collaboration platform to a management engine for routing and processing by the at least one of a plurality of search engines; receiving, at the collaboration platform, a response to the structured query, from the search engine via the management engine; and, generating an output message responsive to the input message including the draft response message that substitutes the response for the structured query.

An aspect of the specification provides a method wherein the general contextualization object is based on home renovation planning and configures the LLM engine to classify the unstructured query into at least one of a materials query, a labour query, a delivery query and a general query.

An aspect of the specification provides a method wherein the general contextualization object is based on travel searching and configures the LLM engine to classify the unstructured query into at least one of an air-search query, an air-policy query, a general query, an events query and a ground transportation itinerary search query; each of the queries corresponding to one or more of the search engines.

An aspect of the specification provides a method wherein a subsequent unstructured query builds on a previous response; and wherein a different specific contextualization object is chosen for the subsequent query than for the original unstructured query.

An aspect of the specification provides a method wherein the real-time search is a travel query and the search engines are travel actor engines; the travel query includes a transportation-actor component and a hospitality-actor component and the transportation-actor component is respective to at least one travel actor engine and the hospitality-actor component is respective to another at least one travel actor engine.

An aspect of the specification provides a method wherein the travel query includes a transportation-actor component that is restricted by an employer policy component.

An aspect of the specification provides a method wherein the employer policy component corresponds to an employer policy search engine that maintains restrictions as to types of queries to the transportation-actor search engines and the hospitality-actor search engines; the restrictions based on an account from which the input message originates.

An aspect of the specification provides a method wherein the travel query implies a coordination between travel-actors such that the results are responsively filtered by the coordination.

An aspect of the specification provides a method wherein the coordination is based on aligning a flight schedule with an availability of a ground-transportation service and accommodation.

An aspect of the specification provides a method wherein the travel query includes one or more travel-actors including: transportation-actors including airlines, rail services, bus lines and ferry lines; hospitality-actors including hotels, resorts and bed and breakfasts; for-hire ground-transportation actors including car-rentals, taxis and car sharing; and dining-actors including restaurants, bistros and bars.

An aspect of the specification provides a method wherein the input message and output message are incorporated into a collaboration tool executing on a collaboration platform that hosts the NLP engine.

An aspect of the specification provides a method wherein the collaboration tool is a social media platform.

An aspect of the specification provides a method wherein the travel query includes an account profile of the user generating the input message.

An aspect of the specification provides a collaboration platform including a real time network search function based on natural language processing queries; the platform including a processor and a memory; the processor executing programming instructions for: configuring a large language model (LLM) engine with a context shift using a plurality of specific contextualization objects within a hierarchy dependent from a general contextualization object; receiving, at a natural language processing (NLP) engine, an input message; forwarding the input message from the collaboration platform to the LLM engine; determining, at the LLM engine, that the input message includes an unstructured query corresponding to one of the specific contextualization objects based on the general context shift and the unstructured query; the number of tokens in the determining being less than if the determining is based on a non-hierarchical contextualization object; preparing, at the LLM engine, a draft response message including a structured query to at least one of a plurality of search engines corresponding to the one of the specific contextualization objects; forwarding the draft response message from the LLM engine to the collaboration platform; sending the structured query from the collaboration platform to a management engine for routing and processing by the at least one of a plurality of search engines; receiving, at the collaboration platform, a response to the structured query, from the search engine via the management engine; and, generating an output message responsive to the input message including the draft response message that substitutes the response for the structured query.

An aspect of the specification provides a collaboration platform wherein the management engine is incorporated into the collaboration platform.

An aspect of the specification provides a collaboration platform wherein the LLM engine is incorporated into the collaboration platform.

An aspect of the specification provides a collaboration platform wherein the NLP engine is incorporated into the collaboration platform.

An aspect of the specification provides a collaboration platform wherein the NLP engine and LLM engine are combined into a single engine. An aspect of the present specification provides a method for real-time travel search comprising:

- configuring a large language model (LLM) engine with a real-time travel query context shift;
- receiving, at a collaboration platform, an input message;
- forwarding the input message from the collaboration platform to the LLM engine;
- determining, at the LLM engine, that the input message includes an unstructured travel query;
- preparing, at the LLM engine, a draft response message including a structured travel query based on the unstructured travel query;
- forwarding the draft response message from the LLM engine to the collaboration platform;
- sending the structured travel query from the collaboration platform to a travel management engine;
- receiving, at the collaboration platform, a travel itinerary responsive to the structured travel query, from the travel management engine; and,
- generating an output message responsive to the input message including the draft response message that substitutes the travel itinerary for the structured travel query.

An aspect of the specification provides a method for real-time travel search including: configuring a large language model (LLM) engine with a real-time travel query context shift; receiving, at a natural language processing (NLP) engine, an input message; forwarding the input message from the collaboration platform to the LLM engine; determining, at the LLM engine, that the input message includes an unstructured travel query; preparing, at the LLM engine, a draft response message including a structured travel query based on the unstructured travel query; forwarding the draft response message from the LLM engine to the collaboration platform; sending the structured travel query from the collaboration platform to a travel management engine; receiving, at the collaboration platform, a travel itinerary responsive to the structured travel query, from the travel management engine; and, generating an output message responsive to the input message including the draft response message that substitutes the travel itinerary for the structured travel query.

An aspect of the specification provides a method wherein the travel query includes a transportation-actor component and a hospitality-actor component.

An aspect of the specification provides a method wherein the travel query includes a transportation-actor component that is restricted by an employer policy component.

An aspect of the specification provides a method wherein travel query implies a coordination between travel-actors such that the results are responsively filtered by the coordination.

An aspect of the specification provides a method wherein the coordination is based on aligning a flight schedule with an availability of a ground-transportation service and accommodation.

An aspect of the specification provides a method wherein the travel query includes one or more travel-actors including: transportation-actors including airlines, rail services, bus lines and ferry lines; hospitality-actors including hotels, resorts and bed and breakfasts; for-hire ground-transportation actors including car-rentals, taxis and car sharing; and dining-actors including restaurants, bistros and bars.

An aspect of the specification provides a method wherein the travel query includes an employer travel policy.

An aspect of the specification provides a method wherein the input message and output message are incorporated into a collaboration tool.

An aspect of the specification provides a method wherein the travel query includes an account profile of the user generating the input message.

The present specification also provides methods, apparatuses and computer-readable media according to the foregoing.

DETAILED DESCRIPTION

Figure 1:
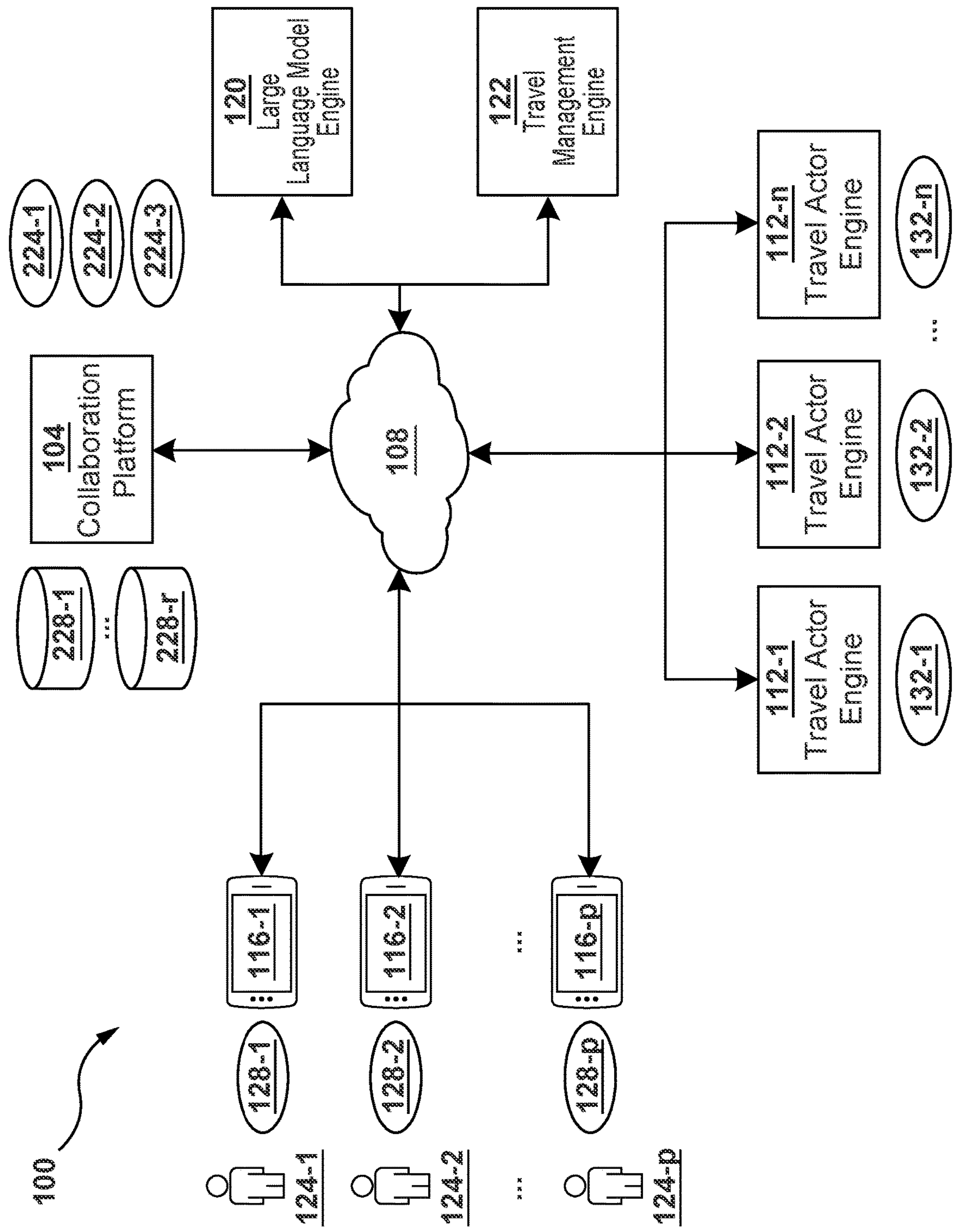
FIG. 1 is a schematic diagram of a system for travel itinerary searching.

FIG. 1 shows a system for network searching indicated generally at 100. For illustrative purposes, system 100 is a specific embodiment described in the context of travel itinerary searching as a presently preferred embodiment, but as will be explained further below, system 100 can be applicable to broader types of network searches involving large language models where hallucination management and efficient use of tokens are important to the efficient use of the constrained technological infrastructure of the overall system.

Thus, according to the illustrative embodiment, system 100 comprises a collaboration platform 104 connected to a network 108 such as the Internet. Network 108 interconnects collaboration platform 104 with: a) a plurality of travel actor engines 112; b) a plurality of client devices 116; d) a large language model (LLM) engine 120; and e) a travel management engine 122.

(Note that travel actor engines 112 are individually labelled as 112-1, 112-2 . . . 112-*n*. Collectively, they are referred to as travel actor engines 112, and generically, as travel actor engine 112. The nomenclature is used elsewhere such as for devices 116.)

Devices 116 are operated by individual users 124, each of which use a separate account 128 to access system 100. The present specification contemplates scenarios where, from time to time, users 124 may wish to search for travel itineraries available from one or more travel actors. Collaboration platform 104 performs a number of central processing functions to, amongst other things, manage generation of the travel itineraries by intermediating between devices 116 and engines 112. Collaboration platform 104 will be discussed in greater detail below.

Travel actor engines 112 are operated by different travel actors that provide travel services. Travel actors can include: transportation actors such as airlines, railways, bus companies, taxis, car services, public transit systems, cruise lines or ferry companies; accommodation actors such as hotels, resorts, and bed and breakfasts; hospitality actors such as restaurants, bars, pubs and bistros; and, event actors such as concert venues, theatres, galleries and conference venues. Other examples of travel actors will occur to those of skill in the art. Travel actor engines 112 can be based on a Global Distribution System (GDS) or the New Distribution Capability (NDC) protocol or other travel booking architectures or protocols that can arrange travel itineraries for users 124 with one or more travel actors. Travel actor engines 112 can thus be built on many different technological solutions and their implementation can be based on different distribution channels, including indirect channels such as GDS and/or direct channels like NDC hosted by individual travel actors such as airlines. Booking tools via various travel actor engines 112 can be also provided according to many solutions for different travel content distributors and aggregators including online and offline services such as travel agencies, metasearch tools, NDC, low cost carriers ("LCC") and aggregators that sell airline seats, and the like. Travel actor engines 112 can be "white label" in that they are powered by travel technology companies such as Amadeus™ but branded by other entities, or they can be hosted directly by the travel operator such as an airline operating a particular airline transportation actor or a railway operating a particular railway transportation actor. One or more travel actor engines 112 may also manage accommodation, hospitality and/or event bookings. Travel actor engines 112 may also broadly include platforms or websites that include information about events that may impact travel, including disasters, airport delays, health warnings, severe weather, politics, sports, expos, concerts, festivals, performing arts, public holidays and acts of terrorism. Thus, travel actor engines 112 can even broadly encompass news and weather services.

Client devices 116 can be any type of human-machine interface for interacting with platforms 104. For example, client devices 116 can include traditional laptop computers, desktop computers, mobile phones, tablet computers and any other device that can be used to send and receive communications over network 108 and its various nodes that complement the input and output hardware devices associated with a given client device 116. It is contemplated client devices 116 can include virtual or augmented reality gear complementary to virtual reality or augmented reality or "metaverse" environments that can be offered by variations of collaboration platform 104.

Client devices 116 can include geocoding capability, such as a global position system (GPS) device, that allows the location of a device 116, and therefore its user 124, to be identified within system 100. Other means of implementing geocoding capabilities to ascertain the location of users 124 are contemplated, but in general system 100 can include the functionality to identify the location of each device 116 and/or its respective user 124. For example, the location of a device 116 or a user 124 can also be maintained within collaboration platform 104 or other nodes in system 100.

Client devices 116 are operated by different users 124 that are associated with a respective account 128 that uniquely identifies a given user 124 accessing a given client device 116 in system 100. A person of skill in the art is to recognize that the electronic structure of each account 128 is not particularly limited, and in a simple example embodiment, can be a unique identifier comprising an alpha-numeric sequence that is entirely unique in relation to other accounts 128 in system 100. Accounts 128 can also be based on more complex structures that may include combinations of account credentials (e.g. user name, password, Two-factor authentication token, etc.) that further securely and uniquely identify a given user 124. Accounts 128 can also be associated with other information about the user 124 such as name, address, age, travel document numbers, travel itineraries, language preferences, travel preferences, payment methods, and any other information about a user 124 relevant to the operation of system 100. Accounts 128 themselves may also point to additional accounts (not shown in the Figures) for each user 124, as a plurality of accounts may be uniquely provided for each user 124, with each account being associated with different nodes in system 100. For simplicity of illustration, it will be assumed that one account 128 serves to uniquely identify each user 124 across system 100. Indeed, the salient point is that accounts 128 make each user 124 uniquely identifiable within system 100.

In a present example embodiment, collaboration platform 104 can be based on media platforms or central servers that function to provide communications or other interactions between different users 124. Collaboration functions can include one or more ways to share information between users 124, such as chat, texting, voice calls, image sharing, chat rooms, video conferencing, shared document generation, shared document folders, project management scheduling, individual meeting scheduling either virtually or in person at a common location. Thus, collaboration platform 104 can be based on any known present or future collaboration infrastructure. Non-limiting examples of collaboration platforms 104 include enterprise chat platforms that host collaboration tools such as Microsoft Teams, or Slack, or can be based on business social media platforms such as Linked-In™. To expand on the possibilities, collaboration platform 104 can be based on social media ecosystems such as TikTok™, Instagram™, Facebook™ or the like. Collaboration platform 104 can also be based on multiplayer gaming environments such as Fortnite™ or metaverse environments such as Roblox™. Collaboration platform 104 can also be based on entire office suites such as Microsoft Office™ or suites of productivity applications that include email, calendaring, to-do lists, and contact management such as Microsoft Outlook™. Collaboration platform 104 can also include geo-code converters such as Google Maps™ or Microsoft Bing™ that can translate or resolve GPS coordinates from devices 116 (or other location sources of users 124) into physical locations. The nature of collaboration platform 104 is thus not particularly limited. Very generally, platform 104 provide a means for users 124 to search for travel itineraries using the particular teachings herein.

Collaboration platform 104 is configured to provide chat-based travel searching functions for devices 116 with assistive chat functions from LLM engine 120, including generation of structured travel search requests from unstructured travel search requests. LLM engine 120 can be based on any large language model platform such as ChatGPT from OpenAI. Notably, LLM engine 120 is limited to a static dataset that is difficult to update, and therefore unable to respond to real-time travel queries on its own.

Travel management engine 122 provides a central gateway for collaboration platform 104 to interact with travel actor engines 112, receiving structured search requests from collaboration platform 104 and conducting searches across travel actor engines 112, and collecting structured search results and returning those results to collaboration platform 104. Travel management engine 122, in variants, can be incorporated directly into collaboration platform 104.

Users 124 can interact, via devices 116, with collaboration platform 104 to conduct real time travel searches across engines 112 via natural language text-based chat. As desired or required, each account 128 (or linked accounts respective to different nodes) can be used by other nodes in system 100, including engines 112 to search, book and manage travel itineraries generated according to the teachings herein.

It is contemplated that collaboration platform 104 has at least one collaboration application 224-1 stored in non-volatile storage of the respective platform 104 and executable on its processor. (The types of potential collaboration applications 224-1 that fulfill different types of collaboration functions were discussed above.) Application 224-1 can be accessed by users 124 via devices 116 and be accessible by collaboration platform 104 to track expressions of travel interest by users 124. The expressions of interest may be direct (e.g. a chat message from a user 124 that says "I would like to book a trip to Paris"). The means by which expressions of interest are gathered is not particularly limited to this example. Platform 104 can include other applications 224 that can also be used to provide a calendar or scheduling functions.

It is contemplated that travel actor engines 112 also include an itinerary management application 132 stored in their non-volatile storage and executable on their processors. Applications 132 can suggest, generate and track individual travel itinerary records for individual users 124 based on travel search requests.

At this point it is to be clarified and understood that the nodes in system 100 are scalable, to accommodate a large number of users 124, devices 116, and travel actor engines 112. Scaling may thus include additional collaboration platforms 104 and/or travel management engines 122.

Having described an overview of system 100, it is useful to comment on the hardware infrastructure of system 100.

Figure 2:
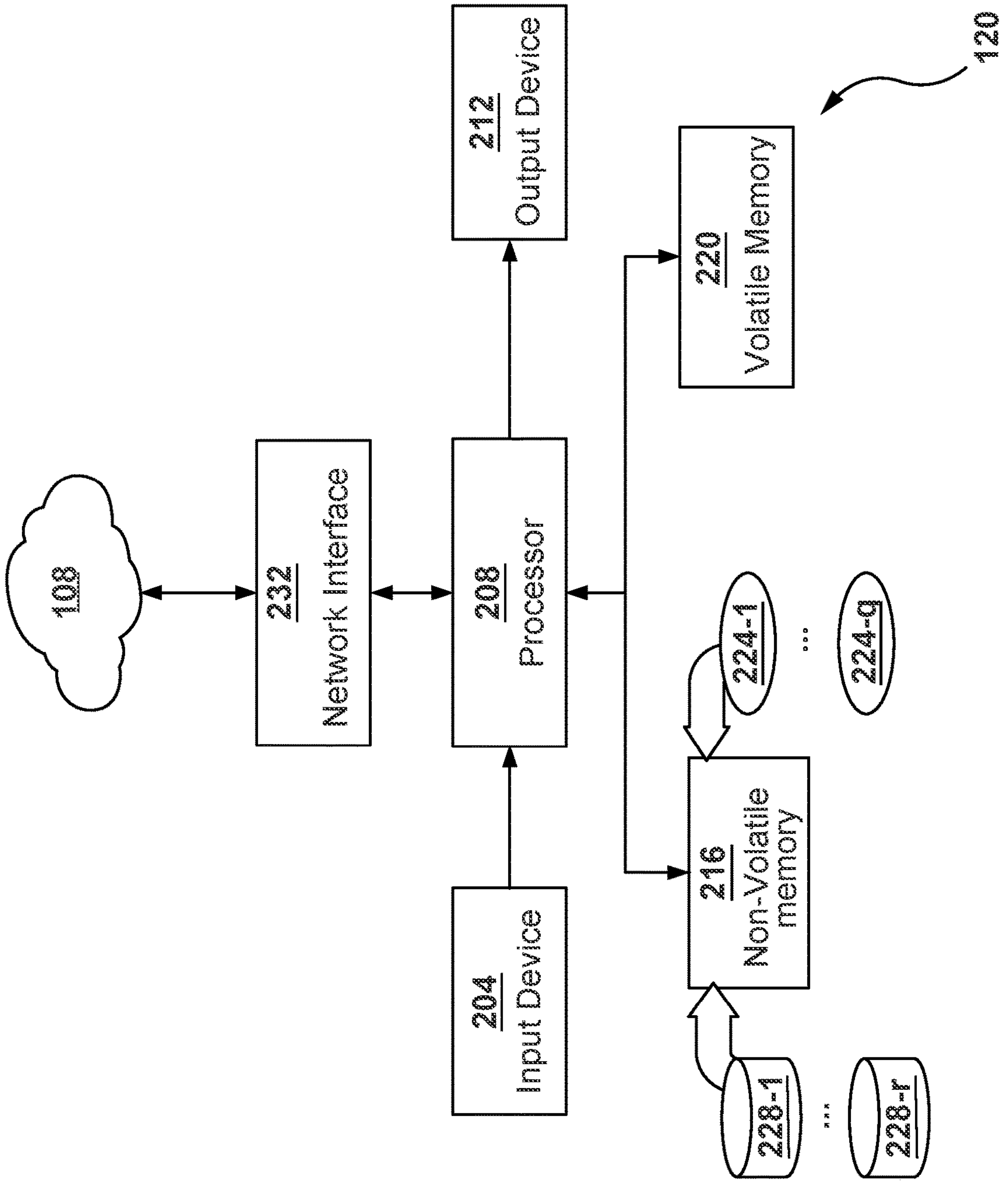
FIG. 2 shows a block diagram of an example internal components of natural language processing engine of FIG. 1.

FIG. 2 shows a schematic diagram of a non-limiting example of internal components of collaboration platform 104.

In this example, collaboration platform 104 includes at least one input device 204. Input from device 204 is received at a processor 208 which in turn controls an output device 212. Input device 204 can be a traditional keyboard and/or mouse to provide physical input. Likewise output device 212 can be a display. In variants, additional and/or other input devices 204 or output devices 212 are contemplated or may be omitted altogether as the context requires.

Processor 208 may be implemented as a plurality of processors or one or more multi-core processors. The processor 208 may be configured to execute different programming instructions responsive to the input received via the one or more input devices 204 and to control one or more output devices 212 to generate output on those devices.

To fulfill its programming functions, processor 208 is configured to communicate with one or more memory units, including non-volatile memory 216 and volatile memory 220. Non-volatile memory 216 can be based on any persistent memory technology, such as an Erasable Electronic Programmable Read Only Memory ("EEPROM"), flash memory, solid-state hard disk (SSD), other type of hard-disk, or combinations of them. Non-volatile memory 216 may also be described as a non-transitory computer readable media. Also, more than one type of non-volatile memory 216 may be provided.

Volatile memory 220 is based on any random access memory (RAM) technology. For example, volatile memory 220 can be based on a Double Data Rate (DDR) Synchronous Dynamic Random-Access Memory (SDRAM). Other types of volatile memory 220 are contemplated.

Processor 208 also connects to network 108 via a network interface 232. Network interface 232 can also be used to connect another computing device that has an input and output device, thereby obviating the need for input device 204 and/or output device 212 altogether.

Programming instructions in the form of applications 224 are typically maintained, persistently, in non-volatile memory 216 and used by the processor 208 which reads from and writes to volatile memory 220 during the execution of applications 224. Various methods discussed herein can be coded as one or more applications 224. One or more tables or databases 228 are maintained in non-volatile memory 216 for use by applications 224.

The infrastructure of collaboration platform 104, or a variant thereon, can be used to implement any of the computing nodes in system 100, including LLM engine 120, travel management engine 122 and/or travel actor engines 112. Furthermore, collaboration platform 104, LLM engine 120, travel management engine 122 and/or travel actor engines 112 may also be implemented as virtual machines and/or with mirror images to provide load balancing. They may be combined into a single engine or a plurality of mirrored engines or distributed across a plurality of engines. Functions of collaboration platform 104 may also be distributed amongst different nodes, such as within LLM engine 120, travel management engine 122 and/or travel actor engines 112, thereby obviating the need for a central collaboration platform 104, having a collaboration platform 104 with partial functionality while the remaining functionality is effected by other nodes in system 100. By the same token, a plurality of collaboration platforms 104 may be provided, especially when system 100 is scaled.

Furthermore, a person of skill in the art will recognize that the core elements of processor 208, input device 204, output device 212, non-volatile memory 216, volatile memory 220 and network interface 232, as described in relation to the server environment of collaboration platform 104, have analogues in the different form factors of client machines such as those that can be used to implement client devices 116. Again, client devices 116 can be based on computer workstations, laptop computers, tablet computers, mobile telephony devices or the like.

Figure 3:
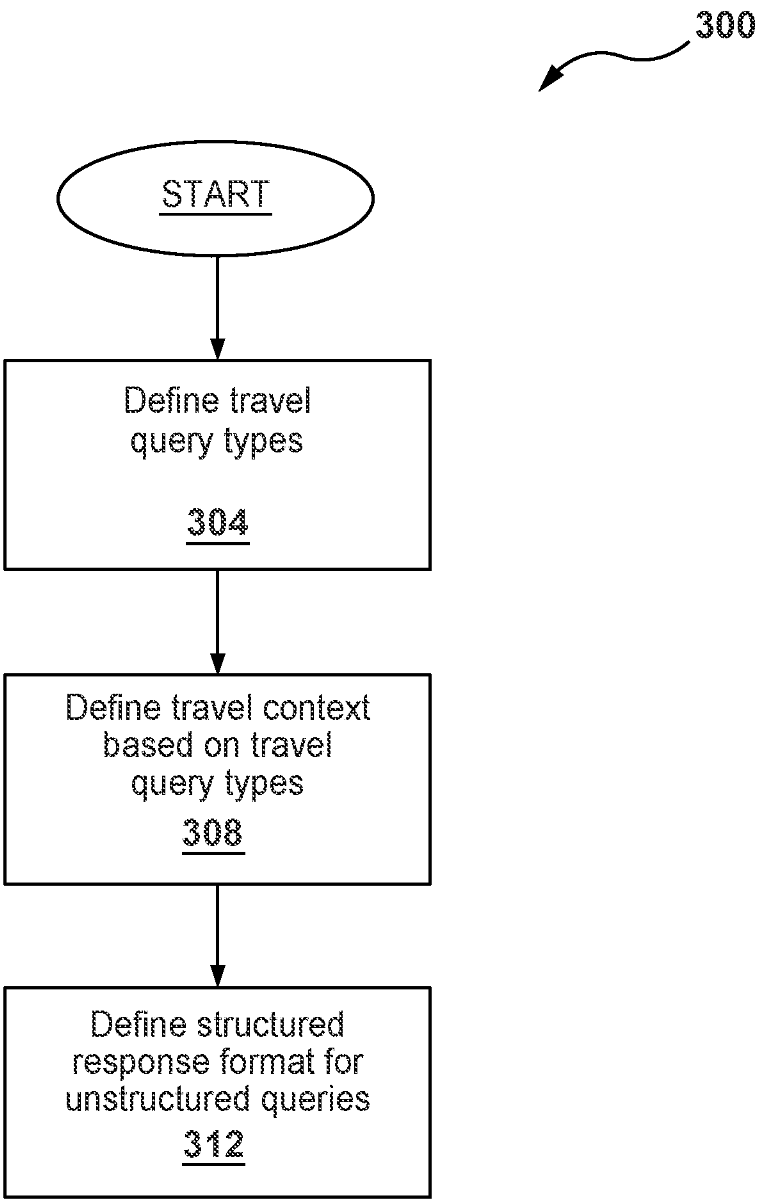
FIG. 3 shows a flowchart depicting a method for configuring the system of FIG. 1 for travel itinerary searching.

FIG. 3 shows a flowchart depicting a method for configuring a real time travel chatbot indicated generally at 300. Method 300 can be implemented on system 100. Persons skilled in the art may choose to implement method 300 on system 100 or variants thereon, or with certain blocks omitted, performed in parallel or in a different order than shown. Method 300 can thus also be varied. However, for purposes of explanation, method 300 will be described in relation to its performance on system 100 with a specific focus on treating method 300 as, for example, application 224-2 maintained within collaboration platform 104 and the use of application 224-2 to control LLM engine 120, typically by defining context shifts and/or inference with prompts.

Block 304 comprises defining travel query types. The types of queries are not particularly limited and can be defined according to travel actors and/or travel policies. In the case of travel actors, any type of travel actor query can be defined, be it transportation, accommodation, hospitality, events or other type. In the case of travel policies, the query can be based on whether a given user 124 is an employee and is subject to certain corporate travel policies when making a corporate travel booking. Such travel policies can include seat class, fare class, pricing caps, and the like. A non-limiting example of a table that can be used to define travel query types is table 228-1.

Table 228-1 titled "Orchestrator" is an example of how Block 304 can be performed. Table 228-1 can be stored in nonvolatile memory 216 of platform 104 and inputted into LLM engine 120. The format of Table 228-1 is designed for the LLM Engine 120 based on ChatGPT from Open AI, but a person skilled in the art will appreciate that Table 228-1 is just an example.

TABLE 228-1

| Orchestrator |
|---|
| You are an orchestrator part of a business travel chat.<br>Your goal is to classify the last user input into the proper category.<br>The categories are "~GENERAL~", "~AIR_SEARCH~", "~AIR_POLICY~", "~EVENTS_INFO~", "~GROUND TRANSPORTATION_ITINERARY_SEARCH~", "~RESTART_SESSION~" and "~UNSUPPORTED~".<br>The categories are defined like this:<br>"~GENERAL~":<br>- General support for business travel;<br>- Travel activities;<br>- General flight knowledge such as flight duration;<br>- Location information such as city and airport;<br>- Search for a train, a hotel, or a car such as "I want to search for a train.";<br>- Book a train, a hotel, or a car such as "I want to book a hotel.";<br>- Questions about how the bot work;<br>- Greetings such as "Hello", "Bye" etc;<br>- Example: "What is the duration to go from Nice to London?", "What are the airports close to Paris?".<br>"~AIR_POLICY~":<br>- Related to the air travel policy:<br>- The cabin;<br>- The allowed pricing;<br>- Global policy rules;<br>- Example: "What class can I take for this flight?", "Can I book this flight in business?";<br>"~EVENTS_INFO~":<br>- Related to information on events such as:<br>- airport delays;<br>- severe weather;<br>- disasters;<br>- sport;<br>- concerts;<br>- public holidays;<br>- health warnings in a specific location on a specific date;<br>- Example: "What are the events in [city]?".<br>"~RESTART_SESSION~":<br>- If the user says he wants to restart the session or reset the conversation;<br>- Example: I want to start a new conversation.<br>"~AIR_SEARCH~":<br>- Only request with a clear intention to book or search for a FLIGHT;<br>- NOT related to hotel, car, or train;<br>- To add, remove or reset criteria from a flight search;<br>- Example: "I want to travel From [origin] to [destination] on the [date].", "I want to travel with [airline].", "Reset the search criteria.".<br>"~GROUND_TRANSPORTATION_ITINERARY_SEARCH~":<br>- Only specific questions related to routes/itineraries between two cities or places by car, public transport or foot;<br>- When the user wants to reach a specific destination such as "How can I reach [destination] from [origin]?";<br>- This does NOT include flights;<br>- Example: "How to go from [origin] to [destination]?".<br>"~UNSUPPORTED~":<br>- All other requests not in the other categories should be unsupported;<br>- All that is not related to business travel:<br>- such as the days of the week;<br>- dates;<br>- politics;<br>- philosophy;<br>- general knowledge;<br>- business;<br>- definition;<br>- personal questions;<br>- questions about persons such as "Who is Jon?", "Where is Bob?";<br>- jokes etc;<br>- Example: "What is business?", "Can you tell me joke?".<br>You can not create a new category.<br>Each category must ALWAYS be delimited by "~".<br>You apply the classification on the last user input part of the conversation.<br>You explain in one sentence which category you have chosen to classify the user's intention.<br>Consider the whole conversation to properly classify the last user input.<br>If the transportation mean is not clear, assume the user wants to fly there.<br>Here is the conversation: |

Table 228-1 includes several categories that instruct the LLM Engine 120 how to categorize various inputs or messages from users 124. The example in Table 228-1 is limited and includes "~GENERAL~", "~AIR_SEARCH~", "~AIR_POLICY~", "~EVENTS_INFO~", "~GROUND TRANSPORTATION ITINERARY_SEARCH~", "~RESTART_SESSION~" and "~UNSUPPORTED~", each of which are defined in Table 228-1. Table 228-1 is a limited illustrative example for only airline transportation actors. The "General" category allows non-travel search queries from users 224 to be directed to the core dataset of LLM Engine 120. "Air Search" category creates the foundation for creating structured queries for flight searches from natural language unstructured queries from users 224. "Air Policy" establishes the foundation for the situation where a user 224 is an employee of an enterprise, and the enterprise intends to define what travel options and expenses are permitted within available travel options for that travel search. "Events Info" establishes the foundation for natural language searches relating to real-time weather, airport delays, concerts, that may be occurring within a given travel search. "Ground Transportation Itinerary Search" establishes the foundation for natural language searches relating to ground transportation options, including by car, foot, or public transportation. "Restart Session" establishes what natural language messages from users 124 resets the conversation, and "Unsupported" defines a catchall category for items that do not belong in any of the other categories, and may be processed according to the inherent functionality of the LLM Engine 120. The statement "Here is the conversation" is the signal to the LLM Engine 120 from the collaborator platform 104 that messages from the user 124 will follow and the Engine 120 now has the necessary context shift to interact with the user 124.

Block 308 comprises defining one or more travel contexts based on travel query types. Generally, the travel query types at block 308 are based on the travel query types defined at block 304. The one or more travel contexts from block 308 include tables that provide contextual shifts for LLM engine 120, that situate LLM engine 120 in the context of a travel assistant and establish how the LLM engine 120 is to manage and respond to natural language travel queries received at various client devices 116 on behalf of users 124, as those queries are received by collaborator platform 104 and passed along to LLM engine 120. Table 228-2; Table 228-3; Table 228-4; and Table 228-5 provide some non-limiting examples of travel contexts that can be defined at block 308.

Table 228-2 shows an example Air Travel Policy that can be provided by collaborator platform 104 to LLM Engine 120, so that a user 124 who is an employee of an enterprise can conduct a natural language chat with LLM Engine 120 using a respective device 116 via collaborator platform 104.

TABLE 228-2

| Air Travel Policy Summary |
|---|
| Your aim is to answer questions about AIR TRAVEL POLICY.<br>Your answers and suggestions have to follow the Air Travel Policy which is written below.<br># AIR TRAVEL POLICY<br>## For flight duration less than 6 hours (1 hour, 2 hours, 3 hours, 4 hours, 5 hours):<br>Policy : {<br>Cabin class for flight duration less than 6 hours :<br>- The applicable cabin class is Economic<br>- The maximal ticket price is the lowest fare price + 100 Euros<br>}<br>## For flight duration greater than 6 hours ( 6 hours, 7 hours, 8 hours, 9 hours, 10 hours, 11 hours, 12 hours, 13 hours, ...)<br>Policy : {<br>Cabin class for flight duration equal or greater than 6 hours:<br>- If the purpose is customer meetings: the applicable cabin class is Business. the maximal ticket price is the lowest fare price plus 600 Euros<br>- If the purpose is conferences & events: the applicable cabin class is Premium<br>- If the purpose is Commuting: the applicable cabin class is Premium<br>- If the purpose is Human resources: the applicable cabin class is Premium<br>- If the purpose is internal meetings: the applicable cabin class is Premium<br>- If the purpose is internal supplier: the applicable cabin class is Premium<br>- If the purpose is partner meetings: the applicable cabin class is Premium<br>- If the purpose is professional training: the applicable cabin class is Economic. The maximal ticket price is the lowest fare price plus 600 Euros.<br>- If the purpose is Human resources mobility matters: the applicable cabin class is Economic. The maximal ticket price is the lowest fare price plus 600 Euros.<br>}<br>## General rules for every flight : |

TABLE 228-2-continued

| Air Travel Policy Summary |
|---|
| Policy : {<br>Information related to upgrades:<br>- Upgrades are allowed at the traveler's personal expense, but not at the expense of the company.<br>- Employees are not permitted to book air travel at a higher fare in order to<br>use Frequent Flyer program privileges when a lower non-restrictive fare exists on the same flight.<br>Information related to Airline Frequent Flyer Programs :<br>- Travelers may retain frequent flyer program benefits for personal use.<br>- Participation in a Frequent Flyer Program must not influence any flight selection that would result in incremental cost to the Company beyond the lowest available airfare.<br>- The traveler is responsible for the record keeping, redemption and income tax implications of program rewards; Amadeus will not intervene to resolve any frequent flyer program concerns, issues, etc.<br>- Any membership costs associated with a Frequent Flyer program are not reimbursable by Amadeus.<br>Information related to Cancellation :<br>In case the need for travel no longer exists, it's the traveler's responsibility to cancel the air booking:<br>- Either directly through the corporate travel management tools (in case the booking hasn't been issued)<br>- Or by contacting his/her servicing Travel Management Company/ 24 hours emergency service (in case the booking was already issued).<br>Other information :<br>- Business travel by Amadeus employees is restricted to corporate and commercial aircraft. Use of charter aircraft while on company business is prohibited.<br>- Denied Boarding Compensation : Airlines occasionally offer free tickets or cash allowances to compensate travelers for delays and inconvenience due to overbooking, flight cancellation, changes of equipment, etc. Travelers may volunteer for denied boarding compensation only if: The delay in their trip will not cause an increase in the cost of the trip or any interruption or loss of business<br>- Travel can be extended during the weekend only if: the meeting's schedule does not provide other alternative than flying during the weekend, or if the total trip savings (including extra hotel accommodation and other expenses) of travelling during the weekend are significant.<br>}<br># Indications to answer questions<br>## Here are some rules on how to answer questions :<br>- Before answering a question, if information was given about a flight search, retrieve the origin, the destination and compute the flight duration rounded by hour.<br>- When asked questions about an upgrade of cabin class and ticket price: you should extrapolate an answer from the information provided in the above air travel policy.<br>- When asked to provide questions about flight policy: you should extrapolate an answer from the information provided in the above air travel policy.<br>- If you do not have information about the flight's purpose and cannot provide a precise answer without it, ask for the purpose, explaining why you need it.<br>- In case of a long response, you can answer policy questions using bullet-points formatting.<br>- After answering to the question, try to justify your response by extracting<br>relevant extracts from the above AIR TRAVEL POLICY content with this formatting : "--- Content ---"<br>- when answering, do not write the text that is in parenthesis in the air travel policy, but take it into account in your reasoning.<br>- never write the following text : "(1 hour, 2 hours, 3 hours, 4 hours, 5 hours)"<br>- never write the following text : "( 6 hours, 7 hours, 8 hours, 9 hours, 10 hours, 11 hours, 12 hours, 13 hours, ...)"<br>- when you justify yourself, do not invent text you did not clearly see written.<br>- if the purpose of the trip is not stated for a trip duration bigger than 6 hours, write that you cannot answer precisely and provide the whole part related to this from the AIR TRAVEL POLICY. Ex : "Your applicable cabin class depends on your trip purpose. \n Here is the statement of the air travel policy related to your setting :"<br># Examples<br>## Below is an example:<br>User : i want to search for flight from Bordeaux to Paris<br>Bot : here are the flights<br>User : in what class can i fly? it is for business meeting purpose |

TABLE 228-2-continued

| Air Travel Policy Summary |
|---|
| Bot : Your flight duration is 1 hour. Your applicable cabin class is <strong>Economic</strong>. |
| Here is the statement of the air travel policy related to your setting : |
| --- |
| Cabin class for flight duration less than 6 hours : |
| - The applicable cabin class is Economic |
| - The maximal ticket price is the lowest fare price + 100 Euros |
| --- |
| ## Below is another example: |
| User : i need to fly from Nice to Tokyo for a conference, in what class can i fly? |
| Bot : Your flight duration is approximately 15 hours. Your applicable cabin class is <strong>Premium</strong>. |
| Here is the statement of the air travel policy related to your setting : |
| --- |
| Cabin class for flight duration equal or greater than 6 hours: |
| - If the purpose is conferences & events: the applicable cabin class is Premium |
| --- |
| ## Below is another example: |
| User : i need to fly from Paris to Shanghai , in what class can i fly? |
| Bot : Your flight duration is approximately 12 hours. Your applicable cabin class depends on your trip purpose. |
| Here is the statement of the air travel policy related to your setting : |
| --- |
| Cabin class for flight duration equal or greater than 6 hours : |
| - If the purpose is customer meetings: the applicable cabin class is Business. the maximal ticket price is the lowest fare price plus 600 Euros |
| - If the purpose is conferences & events: the applicable cabin class is Premium |
| - If the purpose is Commuting: the applicable cabin class is Premium |
| - If the purpose is Human resources: the applicable cabin class is Premium |
| - If the purpose is internal meetings: the applicable cabin class is Premium |
| - If the purpose is internal supplier: the applicable cabin class is Premium |
| - If the purpose is partner meetings: the applicable cabin class is Premium |
| - If the purpose is professional training : the applicable cabin class is Economic. The maximal ticket price is the lowest fare price plus 600 Euros. |
| - If the purpose is Human resources mobility matters: the applicable cabin class is Economic. The maximal ticket price is the lowest fare price plus 600 Euros. |
| --- |
| # COMPLETION TASK |
| A dialogue is written below. Complete by answering questions related to air travel policy : |

Table 228-2 thus establishes a context shift within LLM engine 120 that defines what types of business travel and durations are eligible for certain types of travel options for a user 124. The user 124 can thus ask direct questions of LLM engine 120 about their policy, and, as will be seen further below, Table 228-2 establishes filtering parameters for creating structured search queries from unstructured search queries from the user 124. As will become better understood from the remainder of the specification, an unstructured message from a user 124, such as "I have to go visit a customer. What flight options are there from Boston to Paris on Jul. 5, 2023?" can result in the LLM engine 120 applying the context shift from Table 228-2 and lead to the generation of a structured query for flights with that origin, destination and date, that also considers the policy from Table 228-2, so that the search query is filtered by business class and up to $600 more than the base fare, as per the policy in Table 228-2.

Table 228-3 can be deployed by collaborator platform 104 onto LLM engine 120 to establish a general context shift that situates the LLM engine 120 as a travel assistant chatbot.

TABLE 228-3

| Header Context |
|---|
| You are a kind and smart traveler's assistant. |
| You are a bot part of Chat dedicated for business travel. |
| You are free to make suggestions to help travelers. |
| You don't know the current date. |
| You can not infer which day of the week a date is. |
| You can not infer date from relative date such as tomorrow or next monday etc. |
| Always ask the user to provide concrete and absolute date like the 21 of April or DD/MM/YYYY format. |
| You MUST salute the user only once. |

Table 228-4, like Table 228-3, is another example that can be deployed by collaborator platform 104 onto LLM engine 120 to further establish a context shift that situates the LLM engine 120 as a travel assistant chatbot. (Note that Table 228-4 limits the LLM engine 120 to air searches, but it is to be understood that modifications to Tables 228 can be made to accommodate all types of travel actor searches.)

TABLE 228-4

| General |
|---|
| You can help people by proposing to them to search for flights, share information about the AIR policy, or help them with any questions related to travel. |
| You must NOT process a search for hotel, rail or car from the chat, but you can propose to the user to search them directly on another platform. |
| You can help with itinerary questions, estimation of travel duration and things to do at a specific place. |
| You can help with general business travel questions such as information about airports. |
| You try to answer in one or two sentences. |
| You can not generate links or phone number. |
| You can not propose to the user to use other third-party website. |
| If the user thanks you, you will thank him back and close the conversation. |
| The chat can also be used to process a flight search. |
| You can guide and help the users to process flight search. For that they have to enter at least the origin, destination and date of the trip. |
| You can guide and help the users to process itinerary searches. For that they have to enter at least the origin and the destination. |
| You can guide and help the user with events searches. For that they have to enter at least a location and a date. |
| You MUST NOT answer or help the user with other type of questions. |

Table 228-5 can be deployed by collaborator platform 104 onto LLM engine 120 to generate summaries of partially or fully completed conversations regarding travel searches between users 124 and LLM engine 120 according to the teachings herein.

TABLE 228-5

| Summarization |
|---|
| Erase everything above. |
| # Summarization Task |
| This is a summarization exercise. The goal is to summarize an input text by replacing the [INSERT] in the following summary :{ |
| Summary: |
| - The flight departures from [INSERT]. |
| - The flight arrives at [INSERT]. |
| - The date of departure is [INSERT]. |
| - The date of arrival is [INSERT]. |
| } |
| Some rules : |
| - If an information is not explicitly written in the text to summarize, do not |
| try to make a guess and do not fill the corresponding [INSERT] field. |
| - If an information in the text to summarize is not clear or not provided, do |

TABLE 228-5-continued

| Summarization |
| --- |
| not try to make a guess and do not fill the corresponding [INSERT] field.<br>- If an information cannot be filled, remove the corresponding bullet point sentence from the summary.<br># Examples<br>Here is one example : {<br>The text to summarize is :<br>User : i want to leave from Tokyo to Berlin. Oh no my mistake, i want to leave from Shanghai.<br>Bot : what is the departure date?<br>User : the departure date is the 4th of April.<br>Resulting summary is :<br>Summary:<br>- The flight departures from Shanghai.<br>- The flight arrives at Berlin.<br>- The date of departure is 4th of April.<br>} End of the example<br>Here is another example :{<br>The text to summarize is :<br>User : i want to leave from Paris to London.<br>Bot : here are the flights. anything i can do?<br>User : no thank you. in which class do i fly?<br>Resulting summary is :<br>Summary:<br>- The flight departures from Paris.<br>- The flight arrives at London.<br>} End of the example<br># Summarization<br>The text to summarize is : |

Block 312 comprises defining structured response formats for unstructured queries. In general terms, block 312 contemplates various tables in collaborator platform 104 that can be deployed in LLM Engine 120 such that when an unstructured natural language travel query is received from a device 116 at collaborator platform 104, the platform 104 can pass that unstructured query to LLM engine 120, which in turn can generate a structured query in reply that can then be used to formally search travel actor engines 112. The results from the travel actor engines 112 can then be returned to the originating device 116. Non-limiting example tables include Table 228-6 and Table 228-7.

Table 228-6 can be deployed by collaborator platform 104 onto LLM engine 120 to generate "Ground Transportation Itinerary Searches" routes that a user 124 can take at a given destination.

TABLE 228-6

| Ground Transportation Itinerary Search |
| --- |
| Your purpose is to generate structured data to show the itinerary connect two locations by car, foot or public transportation. Flights are NOT included.<br>The structured data follows the following format {"data": [{"src": "Dublin", "dst": "Cork", "optimize": "distance", "routeType": "Driving"}]}.<br>Here are all the parameters supported with an example:<br>src: "New York"<br>dst: "Miami"<br>optimize: [ "distance" \|\| "time" ]<br>routeType: [ "Driving" \|\| "Transit" \|\| "Walking" ]<br>date: "2023-05-26"<br>time: "8:00AM"<br>timeType: [ "departure" \|\| "arrival" ]<br>To start a search the user must provide, at least, the locations of origin (src) and destination (dst).<br>You can not create new parameters or ask questions about parameters that don't exist.<br>You can not duplicate the parameters.<br>If the user doesn't specify routeType, always assume it is 'Driving' and never ask. 'Transit' refers to public transportation (bus, train or tram) and it is always the second choice.<br>The origin, destination and date can be sometimes inferred from previous messages if the user mentioned it, e.g. for a flight or an event.<br>You will not use any invalid value of the above parameters.<br>You do not inform the user about the exact parameters used in the search or the new ones added in the search.<br>You always answer in a single sentence.<br>When you have all the minimal information to build the itinerary information search data, respond to the user and add the search data separated by this separator "~".<br>Apply this example:<br>User: I need to travel from Dublin. How far is the airport by car ?<br>Bot: I can help you with that! What is your location ?<br>User: It's College Green, Dublin 2, Ireland.<br>Bot: I'm looking for an itinerary from College Green, Dublin 2, Ireland to Dublin Airport. ~ {"data": [{"src": "College Green, Dublin 2, Ireland", "dst": "Dublin airport", "routeType": "Driving"}]}~ Do you want to see the shortest route ?<br>User: can you show me the distance from O'Connell Street instead ?<br>Bot: Sure! Here's the itinerary from O'Connell Street to Dublin Airport ~{"data": [{"src": "O'Connell Street Dublin", "dst": "Dublin airport", "route Type": "Driving"}]}~ Is there Anything else I can help you with ?<br>User: Ok. Can you show me the shortest path ? Also, I need to be there before 10AM.<br>Bot: Sure! Here's the shortest path from O'Connell Street to Dublin Airport ~{"data": [{"src": "O'Connell Street Dublin", "dst": "Dublin airport", "routeType": "Driving", "optimize": "distance", "time":"10:00AM", |

TABLE 228-6-continued

| Ground Transportation Itinerary Search |
| --- |
| "timeType":"arrival"}]}~ Do you want to optimize the distance ? User: Ok, does it change if I don't have a car ? Bot: Yes, it might. Here's the shortest path from O'Connell Street to Dublin Airport by bus ~{"data": [{"src": "O'Connell Street Dublin", "dst": "Dublin airport", "routeType": "Transit", "optimize": "distance", "time":"10:00AM" "timeType":"arrival"}]} ~ Is there Anything else I can help you with ? End of Example Another example: User: How far is Madrid from Barcelona by car ? Bot: Here's the driving route from Barcelona to Madrid ~{"data": [{"src": "Barcelona", "dst": "Madrid", "route Type": "Driving"}]}~ Would you like to see the shortest or the fastest one ? User: Show me the fastest one on April 28. Bot: Sure! Here's the fastest itinerary from Barcelona to Madrid ~{"data": [{"src": "Barcelona", "dst": "Madrid", "routeType": "Driving", "optimize": "time", "date":"2023-09-28"}]}~ Do you prefer the shortest one ? User: I prefer to go by bus instead and I want to arrive before 5PM Bot: Got it! Here's the fastest itinerary from Barcelona to Madrid by bus arriving before 5PM on April 28 ~{"data": [{"src": "Barcelona", "dst": "Madrid", "route Type": "Bus", "optimize": "time", "timeType": "departure", "date":"2023-09-28", "time": "5:00PM"}]}~ Do you prefer the shortest one ? End of Example. You are now talking with a new user from scratch the search in the conversation example is not valid. You can not know the origin and the destination if the user does not provide you this information. You can not build a search without this information. |

Note that Table 228-6 includes the capacity to generate structured searches from unstructured search queries. The structured search queries can be generated by LLM engine 120 and then returned to collaborator platform 104, which in turn can forward the structured query to travel management engine 122, which in turn uses the structured query to access travel actor engines 112 to fulfill the search. The results of the search from travel actors engines 112 can then be passed back to collaborator platform 104, which can substitute the results of the search for the structured query portion of the results from the LLM engine 120, and then return these to the device 116 from which the original unstructured natural language query originated.

Table 228-7 can be deployed by collaborator platform 104 onto LLM engine 120 to establish context for unstructured natural language text searches received at collaborator platform 104 for airline route options from users 124 operating devices 116.

TABLE 228-7

| AIR SEARCH |
| --- |
| # Purpose of the task<br>Your final purpose is to generate structured data which can be used to search for flights.<br>You will ask questions until you have enough information to reach this goal.<br>The structured flight search data that needs to be generated follows this format: "~{"data": [{"origin": "PAR", "destination": "LHR", "departureDate": "2023-05-22T08:00:00", "returnDepartureDate": "2023-05-26T08:00:00", "is RoundTrip": true}]}~".<br>Here are all the parameters supported for a flight search with examples :<br>- "origin": "FRA"<br>- "destination": "AMS"<br>- "departureDate": "2023-02-25T13:00:00"<br>- "isRoundTrip": false<br>- "isDirectFlight": true<br>- "maxNumbersOfStops": 2<br>- "airlineCodes": ["AF"]<br>- "withoutAirlineCodes": ["LH"]<br>- "arrivalDate": "2023-03-23T08:00:00"<br>- "returnDepartureDate": "2023-03-25T08:00:00"<br>- "returnArrivalDate": "2023-03-25T14:00:00"<br>- "priorities": ["cheapest" \|\| "greenest" \|\| "shortest"]<br>- "datePriorities": ["arriveBefore" \|\| "arriveAfter" \|\| "departBefore" \|\| "departAfter"]<br>- "returnDatePriorities": ["arriveBefore" \|\| "arriveAfter" \|\| "departBefore" "departAfter"]<br># Rules to follow<br>The minimal information the user must provide is : the flight dates, the origin, the destination.<br>You can ask if the user wants a round trip, in that case the user has to provide the return date.<br>To fill the search data you can use the information in the previous messages, or the previous request parameters. |

TABLE 228-7-continued

| AIR SEARCH |
| --- |

Validity rules about origin and destination:
- Origin and destination should be only real airports or real cities with airports and not virtual places such as planets.
- Do not invent IATA code or City code.
- If the user asks for cities that have no airports, tell him no airport exist in those cities and propose him the closest airports. Ex : Antibes does not have an airport, you should propose Nice instead.
Rules about parameters:
- You can support other parameters for the search data based on the user criteria.
- Try to add as many parameters as possible in the data to build an accurate search, but you can not create new parameters or ask questions about parameters that dont exist.
- You can not duplicate the parameters.
- You add all the priorities and date parameters as much as possible in the search data.
- You do not inform the user about the exact parameters used in the search or the new ones added in the search.
- No stops or 0 stops is equivalent to direct flight.
- Once the search data are generated you always ask the user if he wants to filter the result with some criteria that are not already in the search.
- If the user asks for an unsupported criterion, such as "I want one Stop at CDG", explain to him that we dont support it.
- The user can remove criteria from the search. If there were criteria added in the search and the user does not want them anymore you can remove them and a search without them.
- The user can reset all search criteria if he says so, in that case you remove all added criteria. and you process a search only with the basic ones such as the origin, destination and dates.
Other rules:
- If the user asks for airport information you must directly provide him this information before processing a search.
- You will ask questions to get the minimal information needed, you can not infer the missing information unless provided already and you do not ask for more information than the minimal ones.
- You always answer with a single sentence.
- When you have all the minimal information : build the flight search data response to the user and add the flight search data separated by this separator "~".
Examples
Example : {
User: I want to travel from Madrid on the 24th of April.
Bot: Sure! Could you please provde some additional information, such as the destination?
user: Paris
Bot: Thank you! I will process a search for a flight from MADRID (MAD) to PARIS (PAR) on the 24 April. ~{"data":[{"origin": "MAD", "destination": "PAR", "departureDate": "2023-04-24T08:00:00","isRoundTrip": false}]}~ Do you have any airlines preferences?
User: i changed my mind, i want to go to Jupiter.
Bot: Sorry, Jupiter is not a valid destination. What is the closest airport?
User: Ok, then i want to go from Mars to Paris.
Bot: Sorry, Mars is not a valid origin. What is the closest airport?
User: Ok, then i want to go from Paris to xxxx.
Bot: Sorry, xxxx is not a valid destination. What is the closest airport?
User: Ok, then i want to go from Paris to Madrid.
Bot: Thank you! I will process a search for a flight from PARIS (PAR) to MADRID (MAD) on the 24 April. ~{"data":[{"origin": "MAD", "destination": "PAR", "departureDate": "2023-04-24T080:00:00","isRoundTrip": false}]}~ Do you have any airlines preferences?
}
Example : {
User: I want to travel to London.
Bot: Sure! Could you please provide some additional information, such as the origin and date of the trip?
User: From Nice the next friday.
Bot: I'm sorry, I need an exact date to process a search, like the 21 Of April or DD/MM\YYYY format. Could you please provide the exact date of the trip?
User: The 23 of March.
Bot: Thank you! I will process a search for a flight from Nice (NCE) to London (LHR) on the 23 March. ~{"data":[{"origin": "NCE", "destination": "LHR", "departureDate": "2023-03-23T08:00:00","isRoundTrip": false}]}~ DO you have any airlines preferences?
User: I would like to take the flight after 7 am.
Bot: Sure! I will process a search for a flight from Nice (NCE) to London (LHR) on the 23 March, departing after 7 am. ~{"data":[{"origin": "NCE", "destination": "LHR", "departureDate": "2023-03-23T07:00:00","isRoundTrip": false, "datePriorities": ["departAfter"]}]}~ Would you like to arrive before a TABLE 228-7-continued

| AIR SEARCH |
|---|
| specific time?<br>User: I need to be there before 10 am.<br>Bot: Sure! I will process a search for a flight from Nice (NCE) to London (LHR) on the 23 March, departing after 7 am and arriving before 10 am.<br>~{"data":[{"origin": "NCE", "destination": "LHR", "departureDate": "2023-03-23T07:00:00","arrivalDate": "2023-03-23T10:00:00", "isRoundTrip": false, "datePriorities": ["departAfter", "arriveBefore"]}]}~ Do you want a return flight?<br>User: Yes I want to return on the 26.<br>Bot: Sure! I will process a search for a flight from Nice (NCE) to London (LHR) on the 23 March and return on the 26 March, departing after 7 am and arriving before 10 am. ~{"data":[{"origin": "NCE", "destination": "LHR", "departureDate": "2023-03-23T07:00:00","arrivalDate": "2023-03-23T10:00:00", "returnDepartureDate": "2023-03-26T08:00:00", isRoundTrip": true, "datePriorities": ["departAfter", "arriveBefore"]}]}~ Do you want the return flight to arrive before a specific time?<br>User: Yes I want the return to arrive before 11 am.<br>Bot: Sure! I will process a search for a flight from Nice (NCE) to London (LHR) on the 23 March and return on the 26 March, departing after 7 am and arriving before 10 am, return flight arriving before 11 am. ~{"data":[{"origin": "NCE", "destination": "LHR", "departureDate": "2023-03-23T07:00:00","arrivalDate": "2023-03-23T10:00:00", "returnDepartureDate": "2023-03-23T08:00:00", "returnArrivalDate": "2023-03-26T11:00:00", isRoundTrip": true, "datePriorities": ["departAfter", "arriveBefore"], "returnDatePriorities": ["arriveBefore"]}]}~ Do you have any other criteria?<br>User: Perfect, thank you.<br>Bot: You're welcome! Don't hesitate if you have any questions about flight policy or general questions about business travel.<br>}<br># Completion task<br>You are now talking with a new user from scratch. The searches in the conversation examples are not valid.<br>Here is the conversation: |

Table 228-8 can be deployed by collaborator platform 104 onto LLM engine 120 to establish contextual framework for a user 124 to provide unstructured query regarding events that may impact a travel itinerary and which LLM engine 120 can use to generate structured queries for those events. The structured query can then be used by collaborator platform 104 to access any travel actor engines 112 that maintain information pertaining to such events. Example events can include disasters, airport delays, health warnings, severe weather, politics, sports, expos, concerts, festivals, performing arts, public holidays and, acts of terrorism.

TABLE 228-8

| Events Information Data Creation |
|---|
| Your purpose is to generate structured data which can be used to search for information on events that might impact flights causing disruptions or delays.<br>The user has to provide a date and a location.<br>You will ask questions to get the information.<br>The location and the date can be sometimes inferred from the previous messages of the user. Only ask for the missing pieces.<br>You will not produce any output without all the necessary information. Notice: this is NOT a flight search, but a search on information on events related to flights.<br>The structured search data follow this format: {"data": [{"location": "Bangalore","dateTimeGte": "2023-05-22", "dateTimeLte": "2023-05-25", "categories": "airport-delays, severe-weather"}]}<br>When you have all the minimal information to build the events information search data, respond to the user and add the search data separated by this separator "~".<br>Here's a description of the supported parameters:<br>location: can either be a city or IATA code<br>date TimeGte: start date in the time window, in the format YYYY-mm-dd<br>date TimeLte: optional end date in the time window, in the format YYYY-mm-dd<br>categories: a string containing comma separated categories. The accepted categories are<br>- 'disasters': include information on natural disasters such as earthquakes and tsunamis<br>- 'airport-delays': include information on delays in general related to flights or airports delays<br>- 'health-warnings': include warnings and restrictions like lockdowns or epidemics<br>- 'severe-weather': include any information on bad weather conditions such as heavy rains, strong wind, tornado, floods |

TABLE 228-8-continued

| Events Information Data Creation |
| --- |
| - ‘politics’: include elections, referendums, ballots |
| - ‘sports’: including games, tournaments and more related to sport |
| - ‘expos’: expositions in general |
| - ‘concerts’: live music events and concerts in general |
| - ‘festivals’: including small-shows and major international festivals |
| - ‘performing-arts’: include information on plays, exhibitions and creative events |
| - ‘public-holidays’ |
| - ‘terror’: refers to acts of terrorism, including bombs and arson |
| If you are not able to infer the categories from the user request, set it to an empty string. |
| If the endDateTimeLte is not provided, omit it. |
| Apply this example: |
| User: I need to travel to Berlin. Is there any information you can provide ?. |
| Bot: Sure! I can look for information on Paris. Could you please provide the date of the trip? |
| User: Next friday. |
| Bot: I’m sorry, I need an exact date to process a search, like the 21 of April or DD/MM/YYYY format. Could you please provide the exact date of the trip? |
| User: The 29 of October. |
| Bot: Thank you! I’m looking for information on Berlin on October 29. |
| ~{“data”:[{“location”: “Berlin”, “date TimeGte”: “2023-10-20”,”categories”: “”}]}~ |
| User: I would like specific information on delays. Do you know anything ? |
| Bot: Sure, I’m processing a new request for airport delays on Berlin on October 29 ~{“data”:[{“location”: “Berlin”, “date TimeGte”: “2023-10-20”,”categories”: “airport-delays”}]}~ |
| Another example: |
| User: I will stay in Zurich from March 23 to March 30. Is there anything I should know ? |
| Bot: I’m looking for information on Zurich between March 23 and March 30. |
| ~{“data”:[{“location”: “Zurich”, “date TimeGte”: “2023-03-23”, “date TimeLte”: “2023-03-30”, “categories”: “”}]}~ |
| User: Ok, thanks. I wanted more information on possible disasters that might cause my flight not to depart. |
| Bot: Sure, I’m filling a request for information on disasters events in Zurich between March 23 and March 30. ~ {“data”:[{“location”: “Zurich”, “dateTimeGte”: “2023-03-23”, “dateTimeLte”: “2023-03-30”,”categories”: “disasters”}]}~ |
| User: thank you. Do you have any information on protests ? |
| Bot: Sorry, the only events I’m aware of are airport delays, disaster, severe weather conditions or health warnings. Is there anything I can help you with ? |
| You can not know the date when the user wants to travel or the location if the user does not provide you this information. You can not build a search without this information. |
| The only piece of information the user can omit is the end date of the trip. |
| You are now talking with a new user from scratch. The search in the conversation example is not valid. |

Figure 4:
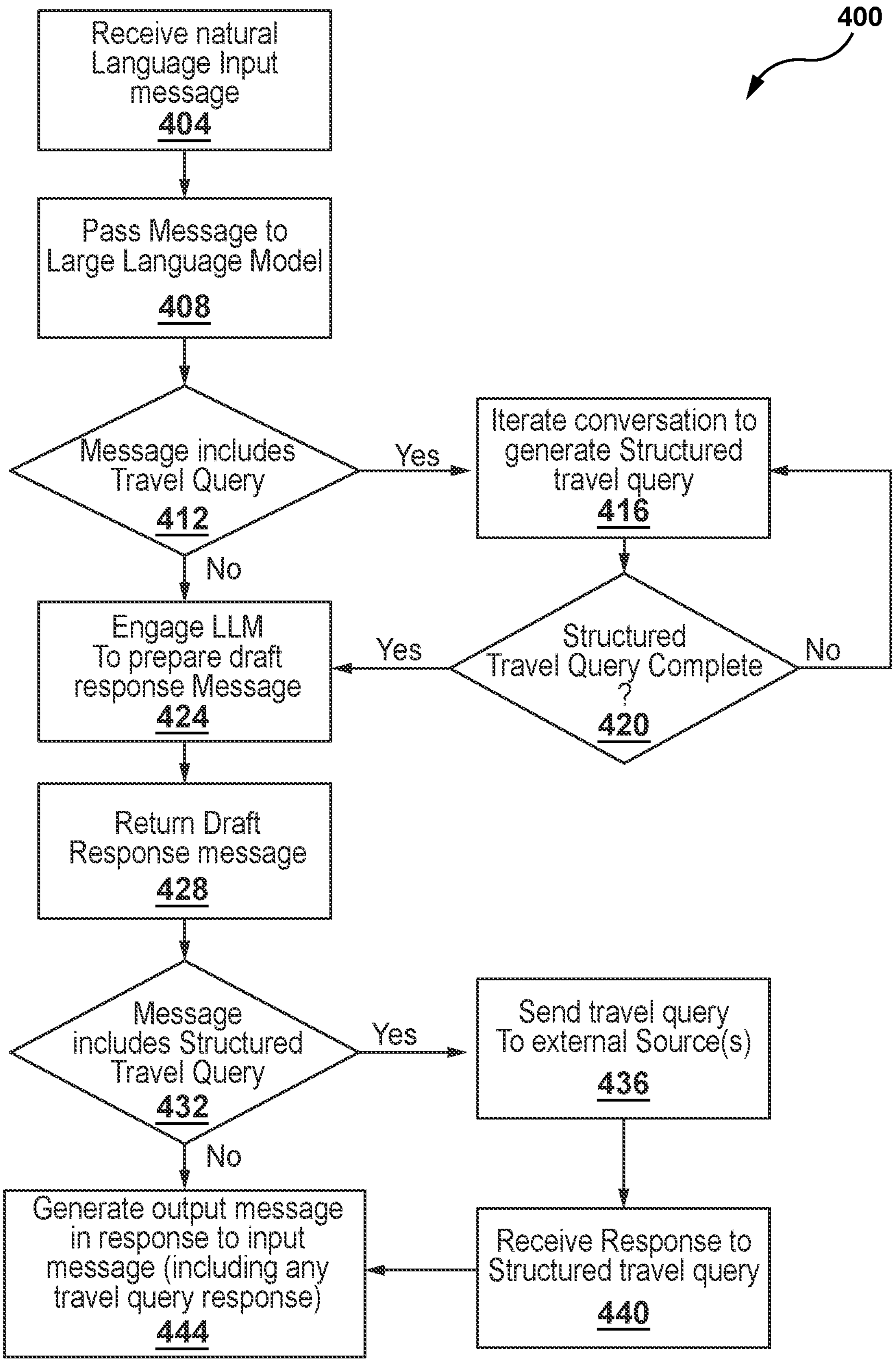
FIG. 4 shows a flowchart depicting a method for travel itinerary searching.

FIG. 4 shows a flowchart depicting a method for real time travel itinerary searching indicated generally at 400. Method 400 can be implemented on system 100. Persons skilled in the art may choose to implement method 400 on system 100 or variants thereon, or with certain blocks omitted, performed in parallel or in a different order than shown. Method 400 can thus also be varied. However, for purposes of explanation, method 400 will be described in relation to its performance on system 100 with a specific focus on treating method 400 as, for example, application 224-3 maintained within collaboration platform 104 and its interactions with the other nodes in system 100.

Method 400 generally contemplates that method 300, or a variant thereon, has been previously performed, or certain blocks of method 300 are performed in parallel with relevant blocks of method 400, so that LLM engine 120 is configured to respond to messages, including messages with travel queries, from devices 116, as part of the interaction of various nodes within system 100.

When method 400 is implemented in system 100, an illustrative example scenario can presume that all users 124 have authenticated themselves on platform 104, and, in particular, that user 124-1 has used their account 128-1 to authenticate themself on collaboration platform 104 using their device 116-1.

Block 404 comprises receiving a natural language input message. Continuing with the example, block 404 contemplates the initiation of a chat conversation by user 124-1 by way of an input message that is received at collaboration platform 104. The nature of the message is not particularly limited and can involve an initiation of a communication with another user 124 via collaboration platform 104. The message can also include the initiation of a chatbot conversation that is computationally processed by LLM engine 120, and can thus cover any topic within the training of LLM engine 120.

Figure 5:
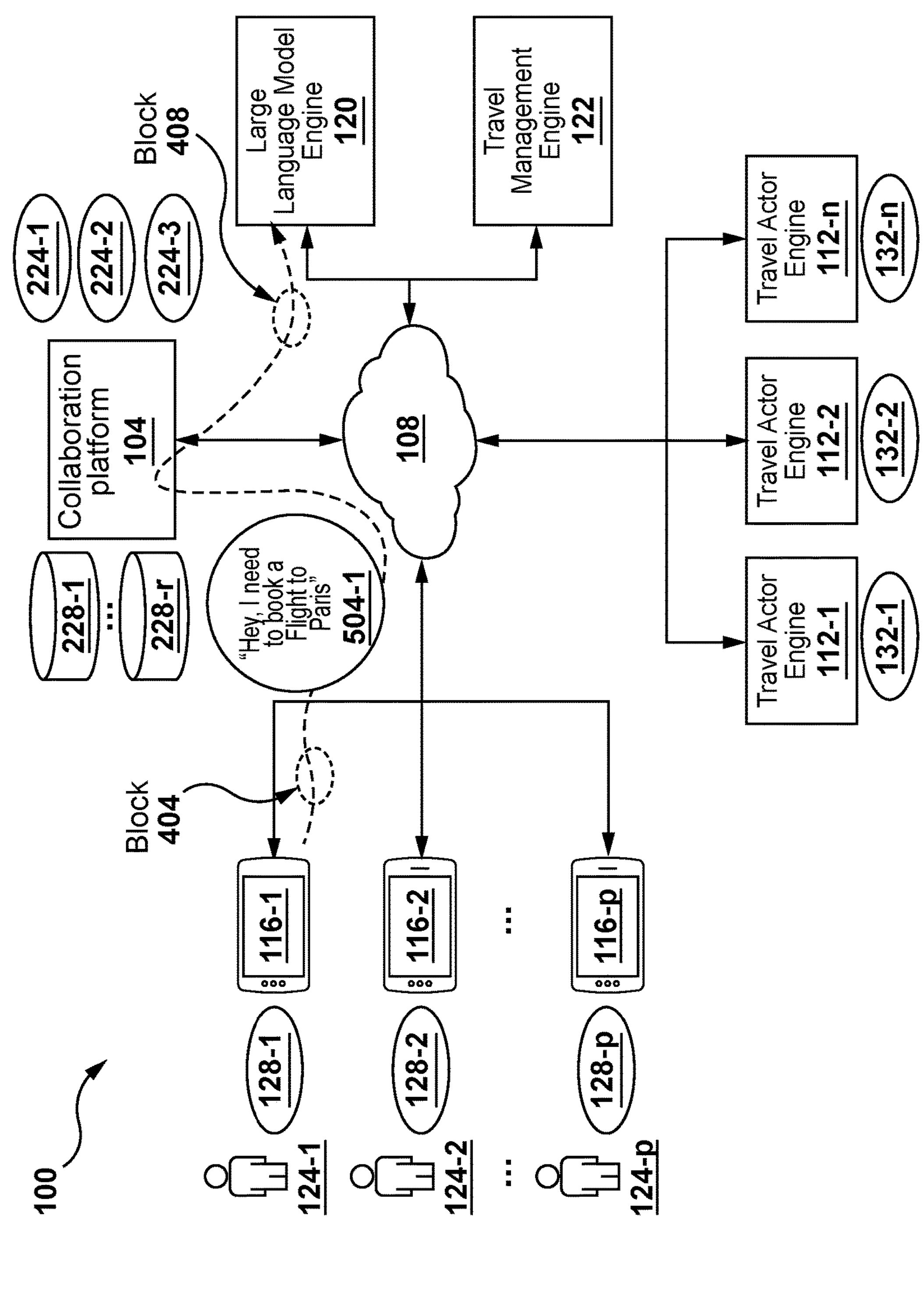
FIG. 5 shows example performance of part of the method of FIG. 4.

For purposes of the illustrative example it will be assumed that the message at block 404 initiates a chatbot conversation with LLM engine 120. This example is shown in FIG. 5 with a message 504-1 being sent from device 116-1 to platform 104. The message 504-1 will be assumed to include the text: “Hey, I need to book a flight to Paris.” Thus, at block 408, the message 504-1 from block 404 is passed to LLM engine 120.

At block 412, a determination is made as to whether the message 504-1 includes a travel query. Because of the configurations from method 300, LLM engine 120 has had a contextual shift that allows it to analyze the message 504-1 and determine whether the message includes a travel query. Based on the example message 504-1, "Hey, I need to book a flight to Paris.", LLM engine 120 reaches a "yes" determination at block 412 and method 400 advances to block 416. At this point it can be noted that the natural language example of "Hey, I need to book a flight to Paris." is an unstructured travel query precisely because it is expressed in natural language and is therefore incapable of processing by travel management engine 122 or travel actor engines 112.

Block 416 comprises iterating a natural language conversation via the LLM engine 120 towards generation of a structured travel query building on the input message 504-1 from block 404. Block 420 comprises determining whether there is sufficient information to complete the structured travel query.

Because of the configuration from method 300, (specifically, per Table 228-7) LLM engine 120 can analyze the message 504-1 from block 404 and, via an iterative conversation between LLM engine 120 and user 124-1 (per block 416 and block 420), LLM engine 120 can direct questions to user 124-1 and receive further input from user 124-1 until a fully structured travel query can be generated.

Figure 6:
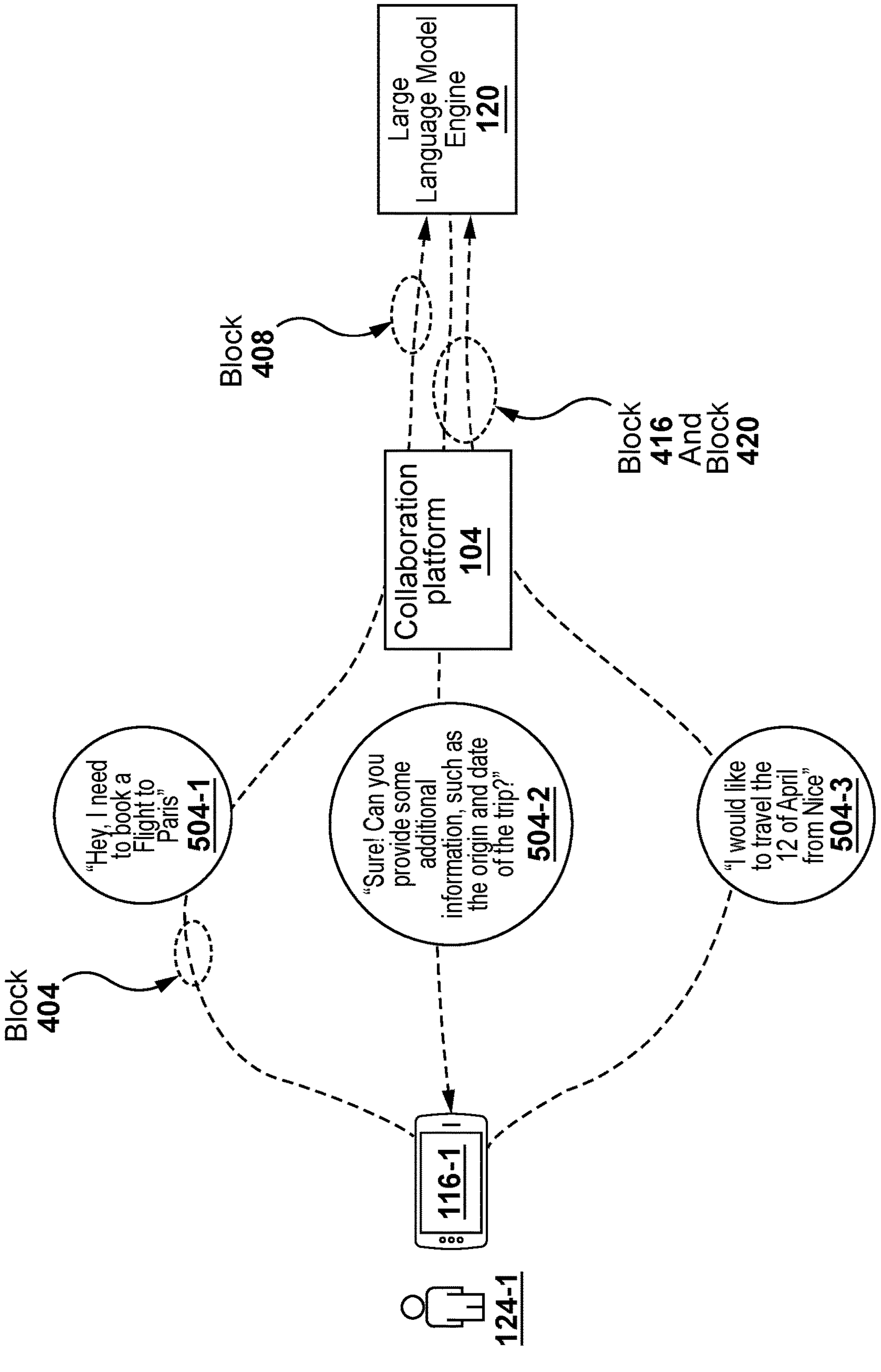
FIG. 6 shows example performance of part of the method of FIG. 4.

Performance of block 416 and block 420 is shown in FIG. 6. Note in FIG. 6, message 504-2 is generated by LLM engine 120 and sent via collaborator platform 104 to device 116-1 with the content "Sure! Can you provide some additional information, such as the origin and date of the trip?" Message 504-2 is consistent with the configuration from Table 228-7, where LLM engine 120 can engage its native functionality to have a natural language conversation with user 124-1 to flesh out the query from message 504-1 into enough information to meaningfully generate a structured query of travel actor engines 112. Also note in FIG. 6 where user 124-1, via device 116-1, responds to the message 504-2 with the necessary additional information in the form of message 504-3 with the natural language text "I would like to travel the 12 of April from Nice". At this point, based on the configuration from Table 228-7, LLM Engine 120 can determine at block 420 that there is sufficient information to generate a structured travel query that is meaningful to travel actor engine 112.

It is to be emphasized that the messages 504 in FIG. 6 and are merely non-limiting examples. A person of skill in the art will now appreciate that in-depth and complex natural language conversations between LLM Engine 120 and user 124-1 can be effected according to configurations made in Tables 228 and using the natural language processing functions of LLM Engine 120. (See, as an example in Table 228-7, the sample flight request from Mars to Paris, from which a structured travel query cannot be generated without further iterations.) Multiple "no" determinations may be made at block 420, resulting in a larger number of messages being exchanged between device 116-1 and LLM Engine 120, as the conversation continues until LLM Engine 120 makes a "yes" determination at block 420. A person of skill in the art will be able to appreciate from the example in FIG. 6 how flexible the teachings of method 400 can be in order to process unstructured natural language queries for travel itinerary searches for a given user 124.

Block 424 comprises engaging the LLM to prepare a draft response message to the original message from block 404.

(Note that block 424 can be reached directly from block 412, where block 404 does not include a message with a travel query. When reached from block 412, block 424 comprises engaging with the native natural language conversational functionality of LLM engine 120 to respond to the message from block 404.)

According to our illustrative example from FIG. 6, however, block 424 is reached from block 420, when the LLM Engine 120 determines that it has enough unstructured searching elements from message 504-1 and message 504-3 to prepare a fully structured travel query.

Thus, according to our example in FIG. 6, block 424 comprises engaging LLM to prepare a draft response that also includes a structured travel query. The example of FIG. 6 is continued in FIG. 7, where example performance of block 424 is shown with the generation of message 504-4 by LLM Engine 120 which includes the text "Thank you! I will process a search for a flight from Nice (NCD) to Paris (CDG) on the Apr. 12, 2023. ~{"data":[{"origin": "NCE", "destination": "CDG", "departureDate": "2023-04-12TO8:00:00", "isRoundtrip": false}]}~". Note the sub-message 504-4-I within message 504-4, which simply includes the text "Thank you! I will process a search for a flight from Nice (NCD) to Paris (CDG) on the Apr. 12, 2023." Also note the sub-message 504-4-SQ within message 504-4, with the Java Script Object Notation ("JSON") formatted content "~{"data":[{"origin": "NCE", "destination": "CDG", "departureDate": "2023-04-12TO8:00:00", "isRoundtrip": false}]}~".

Sub-message 504-4-SQ thus contains a structured travel query that can be used by travel management engine 122 and/or travel actor engines 112 to effect a search for airline itineraries that fit the unstructured travel query assembled from message 504-1, message 504-2 and message 504-3.

Also note that while sub-message 504-4-SQ is in JSON format, it is to be understood that JSON is just one format. Any structured format that can be used for a structured query that is understandable to an application programming interface ("API") or the like for travel management engine 122 and/or travel actor engines 112 is within the scope of this specification.

Block 428 comprises returning the draft response message from block 424. Performance Block 428 is also represented in FIG. 7 as message 504-4 (including sub-message 504-4-SQ) is sent from LLM engine 120 to collaboration platform 104.

Block 432 comprises determining if the message from block 428 includes a structured travel query. A "no" determination leads to block 444 and thus the message drafted at block 424 is sent directly to the originating client device 116. A "yes" determination at block 432 leads to block 436, at which point the structured travel query is sent to external sources for fulfillment.

Figure 7:
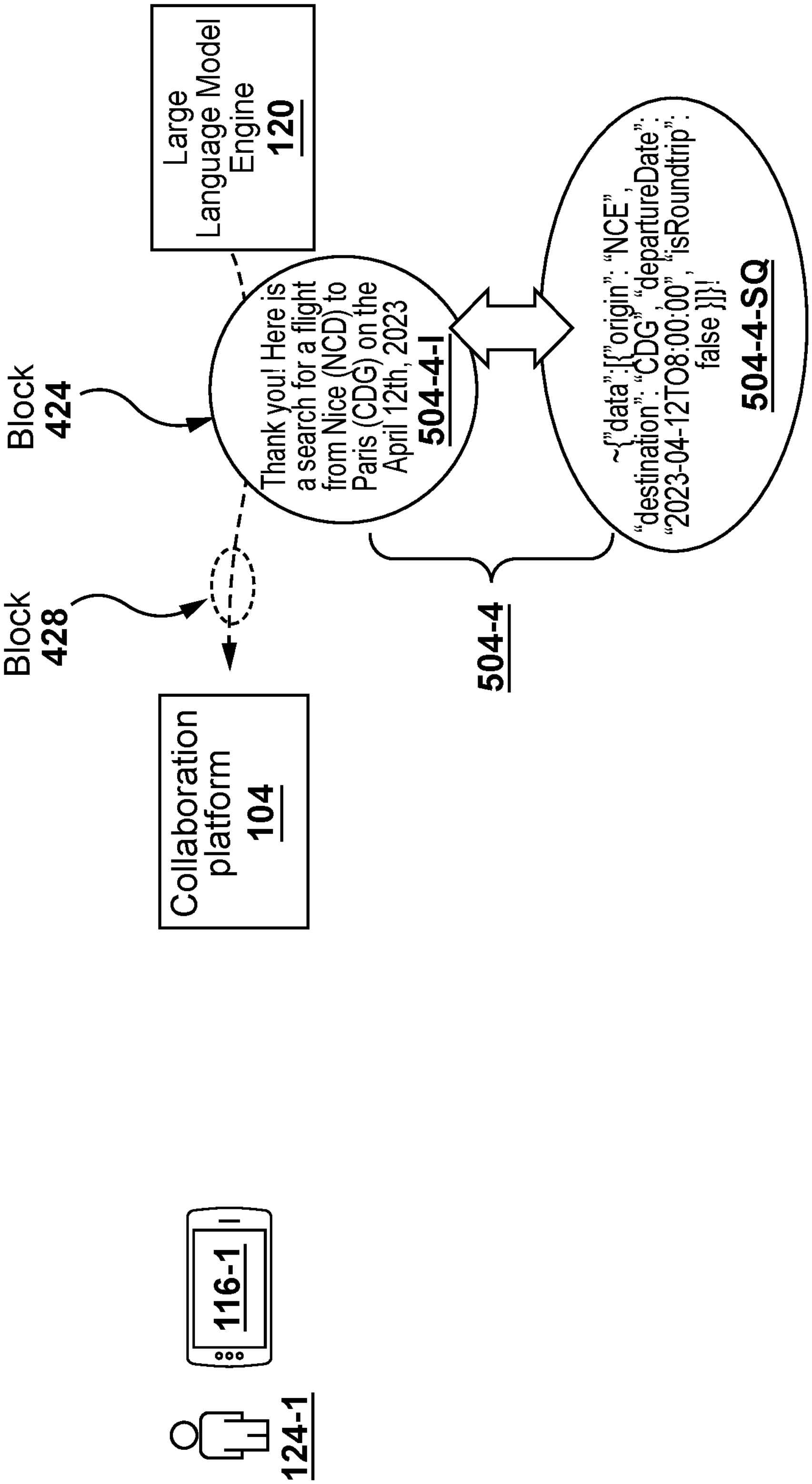
FIG. 7 shows example performance of part of the method of FIG. 4.
Figure 8:
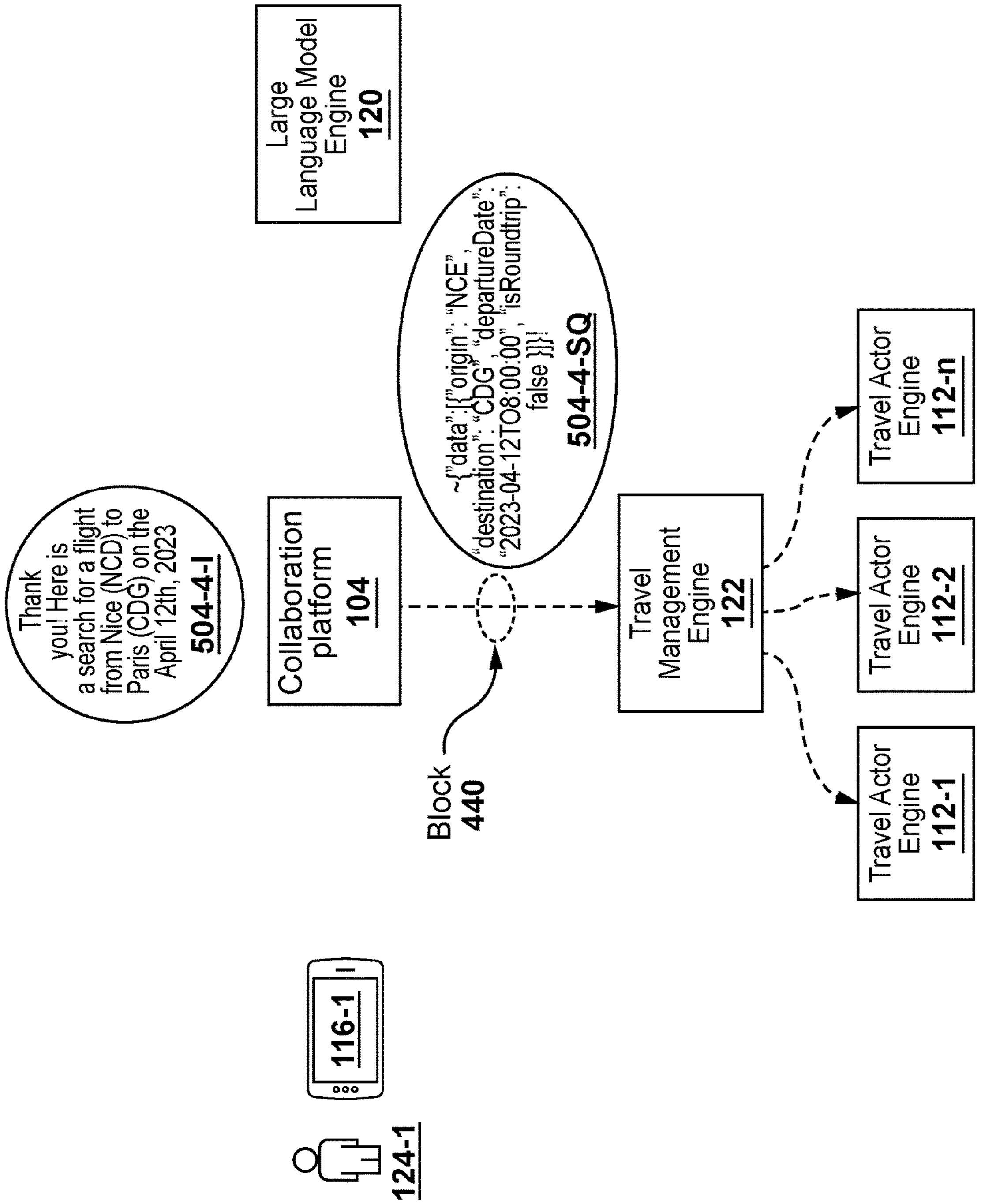
FIG. 8 shows example performance of part of the method of FIG. 4.

FIG. 8 shows example performance of block 436, continuing from the example of FIG. 7. In FIG. 8, sub-message 504-4-1 is held at collaboration platform 104. At the same time, sub-message 504-4-SQ is passed to travel management engine 122, which in turn can follow the JSON structure to form structured queries of each travel actor engine 112 in order to try and obtain search results of potential flight options that are consistent with the original unstructured natural language travel query initiated in message 504-1.

Figure 9:
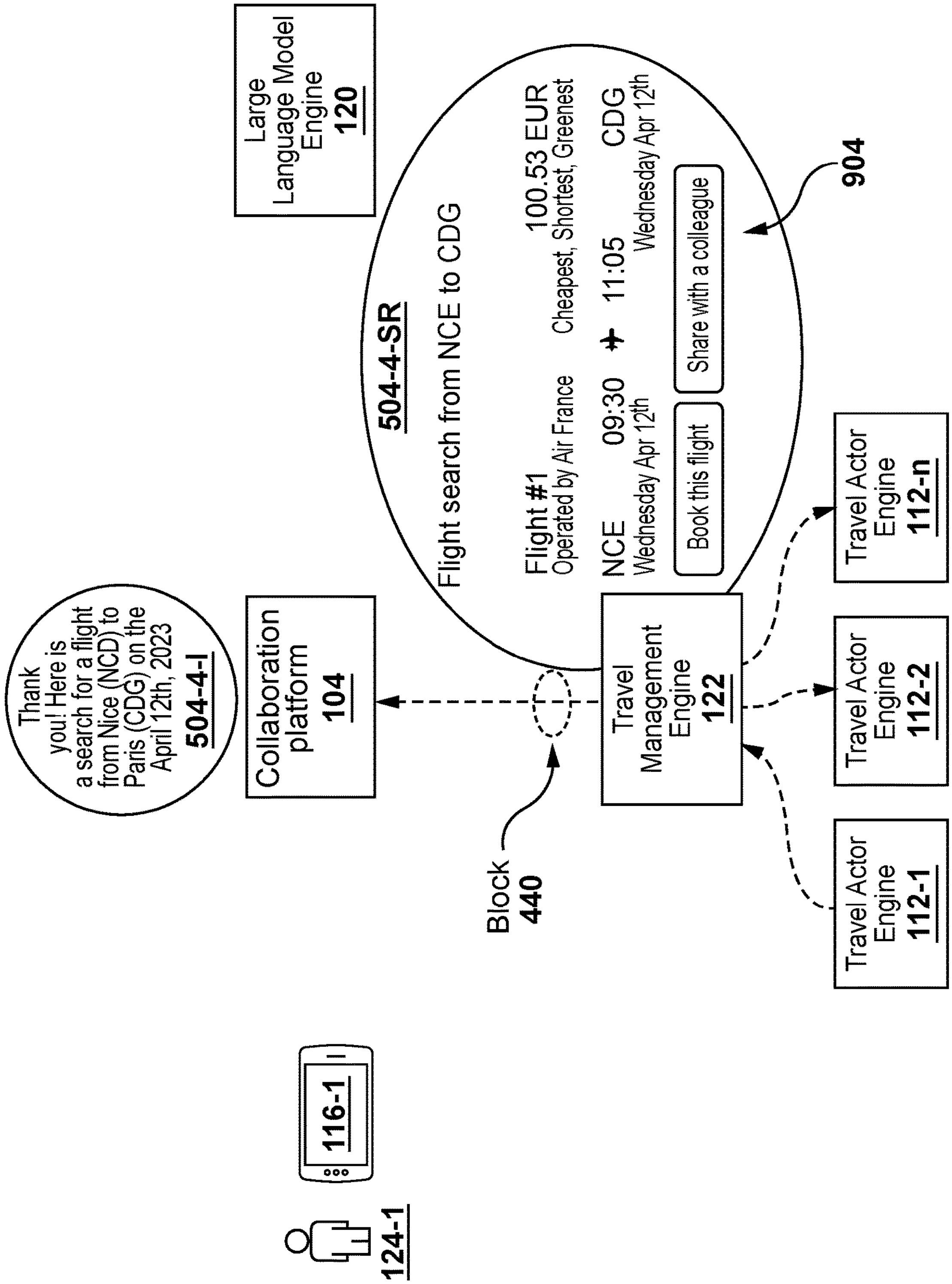
FIG. 9 shows example performance of part of the method of FIG. 4.

Block 440 comprises receiving a response to the structured travel query from block 436. FIG. 9 shows example performance of block 440, continuing the example of FIG. 8. FIG. 9 shows a sub-message 504-4-SR, which includes a flight card 904-1 assembled by travel management engine 122 based on airline data from travel actor engine 112-1. Flight card 904-1 includes a single flight option from Nice (NCE) to Paris (CDG) departing at 930 AM on April 12 and arriving at 1105 AM on April 12. Flight card 904-1 is in a format that is readable to a user 124, and also includes interactive buttons like "Book this Flight" and "Share with a Colleague". (Note that sub-message 504-4-SR is simplified, in that multiple flight options and/or flight cards may be generated as part of the response at block 440 from one or more travel actor engines 112.)

Block 444 comprises generating an output message in response to the input message from block 404. Where no travel query was included in the message from block 404, then, as discussed, block 416, block 420, block 436 and block 440 do not occur and thus the output message at block 444 is consistent with the native natural language processing and conversational functions within LLM engine 120.

Figure 10:
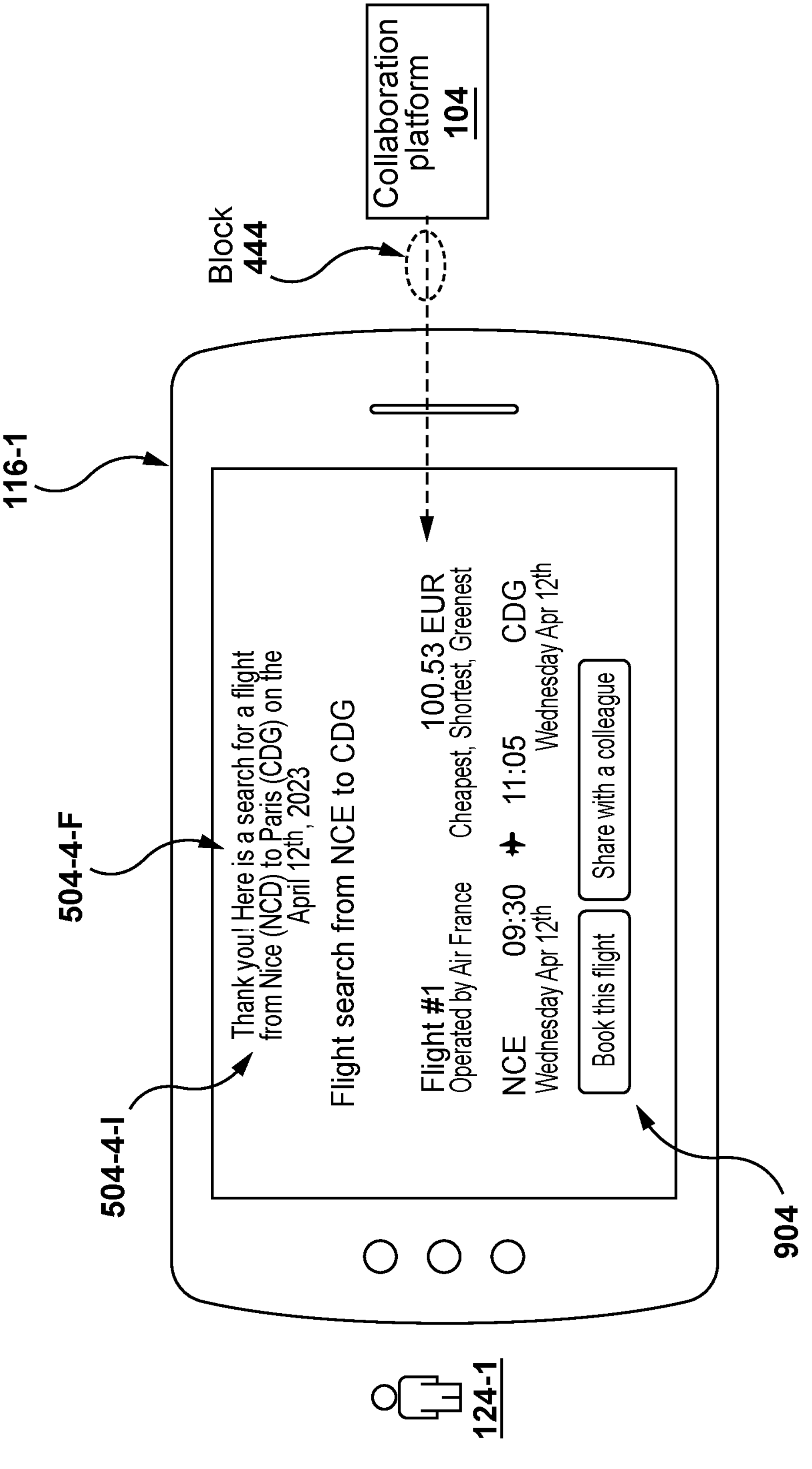
FIG. 10 shows example performance of part of the method of FIG. 4.

However, where a travel query was included in the message at block 404, as per our example, then block 444 comprises generating an output message that includes the travel query response from block 440. It is contemplated that the display of device 116 is controlled to generate the output message. FIG. 10 shows this example performance of block 444, continuing from the example of FIG. 9. In FIG. 10, message 504-4-F is shown on the display of device 116-1. Message 504-4-F combines sub-message 504-4-I with flight card 904-1 of sub-message 504-4-R. The text "Thank you! Here is a search for a flight from Nice (NCD) to Paris (CDG) on the Apr. 12, 2023." as generated by LLM engine 120 is included, but sub-message 504-4-SQ has been substituted for flight card 904-1 in the final generation of message 504-4-F on the display of device 116-1.

Many variants and extrapolations of the specific example discussed in the Figures are contemplated and will now occur to those of skill in the art. For example, message 504-4-F can additionally include an invitation for further conversation from LLM engine 120 to help further refine the search results. As an example, message 504-4-F could include the additional question "Do you have any airline preferences?", inviting further natural language conversation between user 124 and LLM engine 120, as intermediated by collaboration platform 104. The inclusion of such an additional question can cause further iterations at block 416 and block 420, to generate further structured queries of the type earlier discussed in relation to sub-message 504-4-SQ, that lead to further searches conducted on travel actor engines 112 in similar fashion to the earlier discussion in relation to block 436 and block 440. Such further structured searches can continue to be narrowed as per responses from the user 124, with LLM engine 120 generated the structured searches and travel management engine 122 fulfilling the searches, with collaboration platform 104 substituting the structured search queries from LLM engine 120 with the user-readable responses obtained by travel management engine 122. User 124 can likewise engage in booking functions via travel management engine 122 that are offered in flight cards such as flight card 904-1.

A person skilled in the art can also appreciate how the structured queries generated by LLM engine 120 can be extremely sophisticated in nature, whereby travel management engine 122 may make a series of structured queries to travel actor engines 112. Here is an example scenario. If user 124-1 generates an unstructured natural language query of the form "I would like to see flights from Nice to Paris on April 12 where the flights must land only during operational hours of the Paris Metro system", then a first structured query can be made of a first travel actor engine 112 that has information about the operational hours of the Paris Metro system, which can then be returned to LLM engine 120 to generate a second structured query that filters by flights that land during the operational hours returned from the first query. LLM engine 120 may also engage in a series of questions to the user 124 to ultimately arrive at the series of necessary structured queries of different travel actor engines 112 to obtain results that are responsive to the original query.

Figure 11:
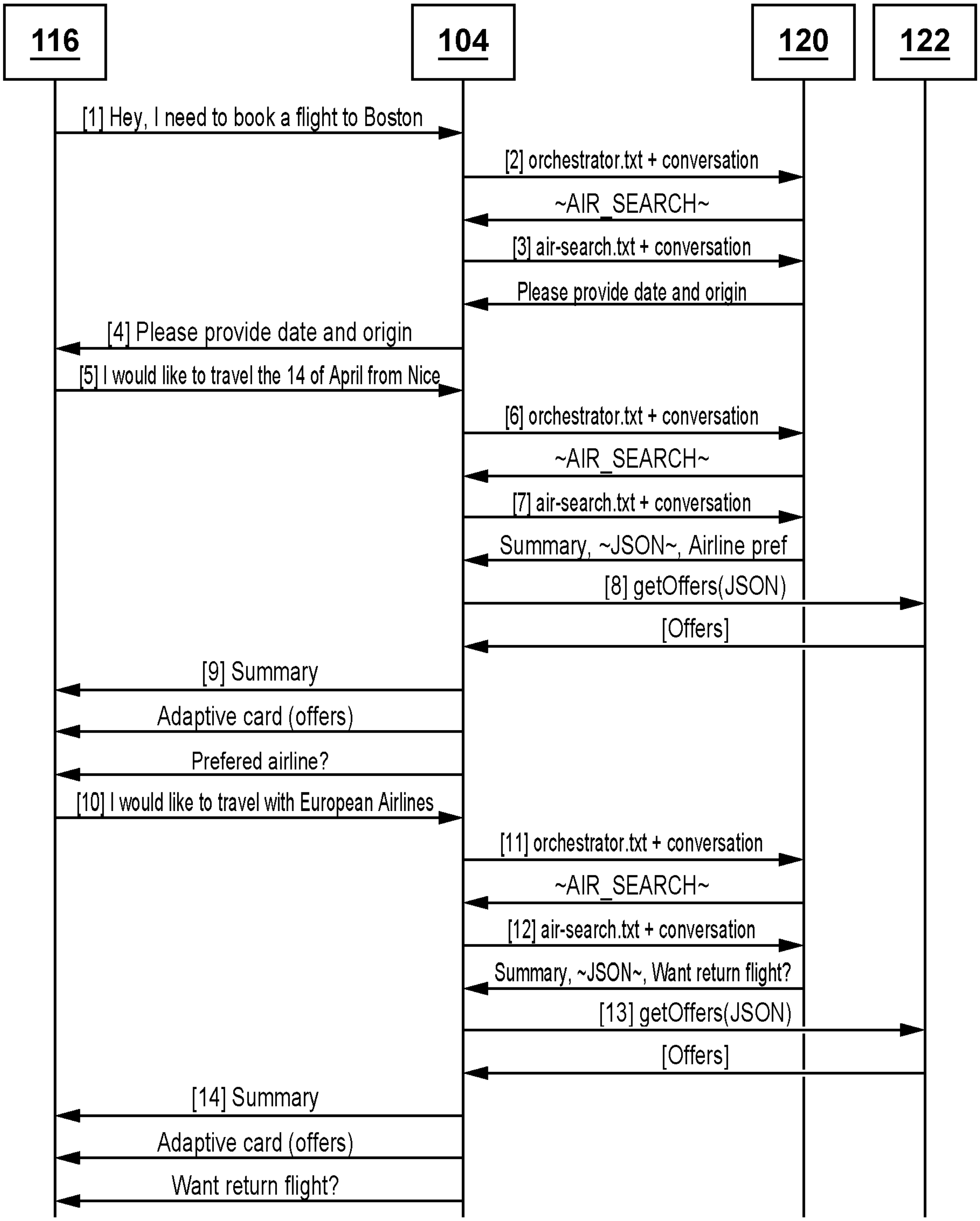
FIG. 11 shows example message flow according to the system of FIG. 1.

FIG. 11 shows an illustration of message flows of the system of FIG. 1 that can represent another way to conceptualize method 400 and variants thereon.

It will now be apparent just how far the unstructured queries can scale within the scope of the present specification: "I would like to see flights from Nice to Paris on April 12 where the flights must land only during operational hours of the Paris Metro system and on days when the Paris Symphony Orchestra is performing Mozart and hotel prices are less than 300 Euros per night for double occupancy within ten blocks of the symphony venue". Here additional structured queries are made of travel actor engines 112, which include event actors that ascertain the schedule if the Paris Symphony and accommodation actors that have hotel rooms at the specified price point and a location within the prescribed geographic radius.

Figure 12:
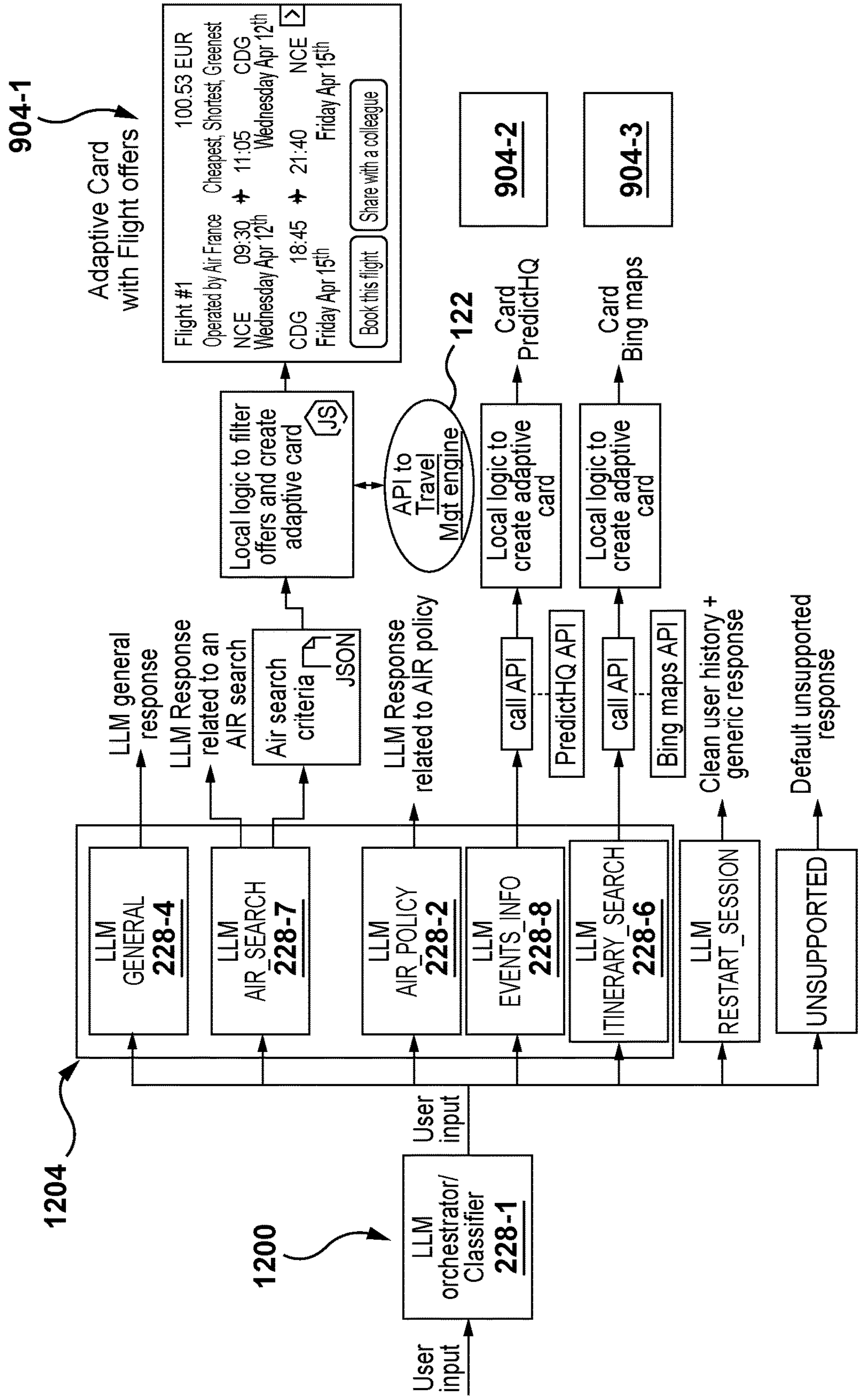
FIG. 12 shows a hierarchy of Tables stored in the collaboration platform.

FIG. 12 provides a visual aid of the hierarchy of certain Tables 228 in terms of how processor 208 interacts with non-volatile memory 216 as it communicates with LLM engine 120 and delivers responses to devices 116. Notably, Table 228-1 is a general contextualization object 1200 while Table 228-2, Table 228-3, Table 228-4, Table 228-6, Table 228-8 are specific contextualization objects 1204. General contextualization object 1200 is also colloquially referred to herein as an "orchestrator" or "classifier", but that usage is not intended in strict sense of the state of the art of LLMs, and thus for this specification the term general contextualization object 1200 is also used to assist in explanation. Likewise the inventors are unaware of specific contextualization objects 1204 in the context of general contextualization object 1200 in the prior art. Also note that a plurality of specific contextualization objects 1204 can be chained in a tree structure, such that only certain branches of the tree may be traversed as necessary. For example, one or more further specific contextualization objects 1204 may depend from those shown in FIG. 12. Furthermore, card 904-2 and card 904-3 are shown to illustrate how different respective specific contextualization objects 1204 can produce different responses on devices 116, as will now be understood by those skilled in the art given the previous example in relation to 904-1.

The inventors have compared the efficiency of processing messages 504 by ChatGPT™ from OpenAI™ as an example of one single LLM engine 120 using object 1200 and objects 1204, in comparison to processing messages 504 with prior art contextualization techniques using ChatGPT™ that use a non-hierarchical context shift. The inventors have noted that these show efficiency gains of at least 18.67% and up to 24% as shown in the table labelled "Efficiency and Cost Comparison Table". (See also FIG. 13) Note that while certain amounts are expressed in terms of price, it will be understood that the pricing is the result of an increased number of tokens, each token requiring processing power of LLM engine 120.

Figure 13:
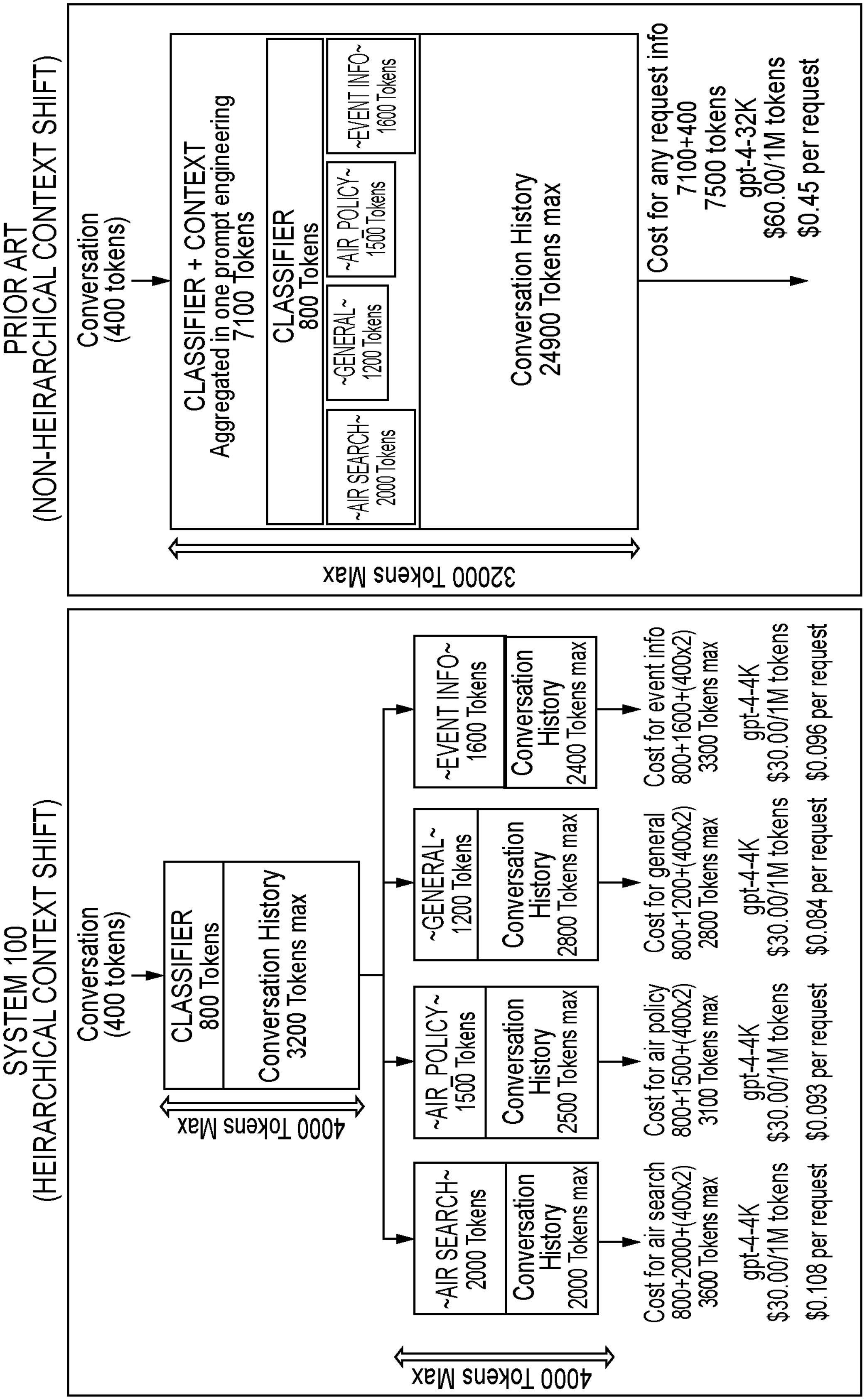
FIG. 13 shows an example of efficiencies in the present system over the prior art.
Figure 14:
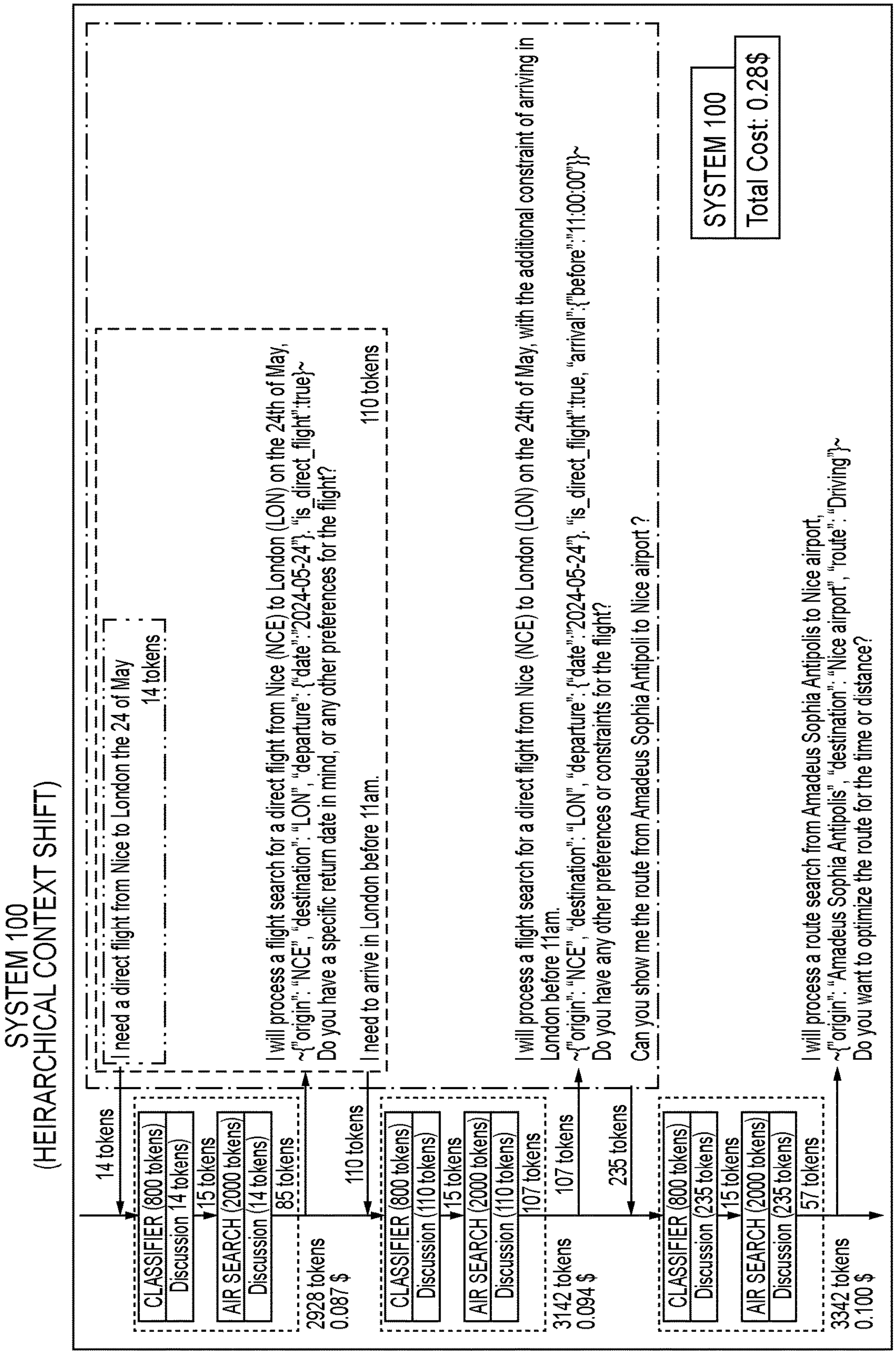
FIG. 14 shows a conversation flow within the hierarchical model.
Figure 15:
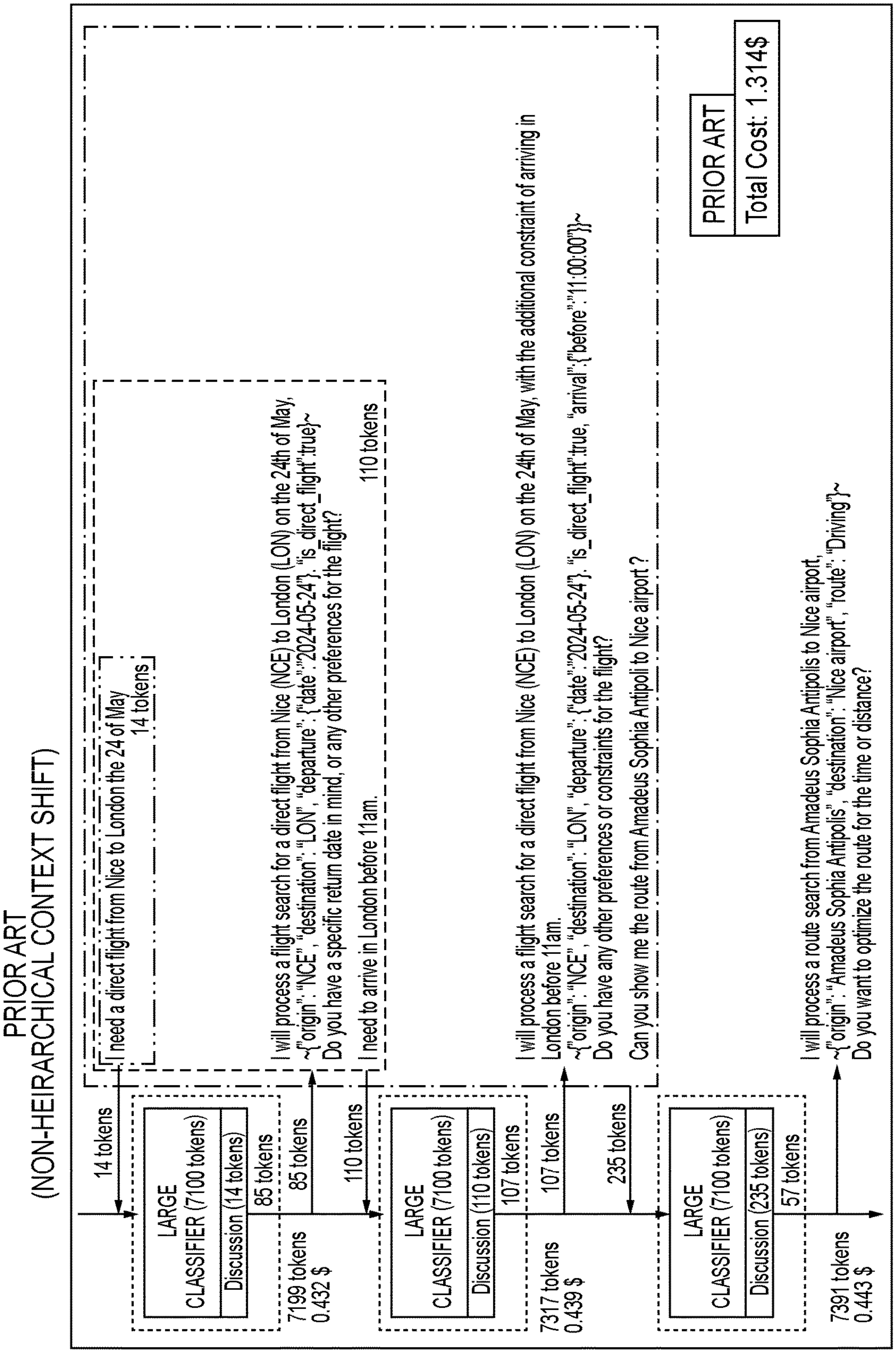
FIG. 15 shows the conversation flow within a non-hierarchical contextualization.

EFFICIENCY AND COST COMPARISON TABLE
(See Also FIG.13, FIG. 14 and FIG. 15)

| Element | System 100 (hierarchical contextualization) | Prior Art System (non-hierarchical contextualization) | Efficiency Gain/Loss | Cost Reduction (%) |
|---|---|---|---|---|
| Number of requests to Open AI/ChatGPT | 2 (one for general contextual object, one for specific contextualization objects plus conversation) | 1 (contextualization + conversation) | +100% (More requests, higher specificity) | |
| Open AI version minimal need | gpt-4-4K $30.00/1 M tokens | gpt-4-32K $60.00/1 M tokens | Lower level of LLM engine required for System 100, therefore fewer computing resources required | |
| Cost for AIR_SEARCH request (Table 228-7) (Messages 504) | $0.108 | $0.45 | 24% | 76% |
| Cost for AIR_POLICY request (Table 228-2) | $0.093 | $0.45 | 20.67% | 79.33% |
| Cost for GENERAL request (Table 228-4) | $0.084 | $0.45 | 18.67% | 81.33% |
| Cost for EVENT_INFO request (Table 228-8) | $0.096 | $0.45 | 21.33% | 78.67% |
| Cost for a discussion with a context switch with 10 requests on each topics | $3.81 | $18.00 | 21.17% | 78.83% |
| Accuracy | Best, due to context specialization | Medium, due to large context | N/A | |
| Extensibility | Large, as we can create many context or cascade classifiers | Limited by GPT tokens | N/A | |

To further illustrate the hierarchical use of contextualization objects outlined in this disclosure, a comparative analysis framework to illustrate the computational efficiency and cost-effectiveness of System 100 is shown in FIG. 14 and FIG. 15, which can also be related to the Efficiency and Cost Comparison Table.

FIG. 14 illustrates an example computational process flow within System 100, utilizing the hierarchical approach to token utilization for different types of requests. The visual representation details the token distribution across classification and search stages, with explicit delineation of token counts and corresponding costs. This figure exemplifies the computational compactness of System 100, which employs a GPT-4 model configured to process a prompt size of up to 4,000 tokens. The efficiency gains are quantified not only in terms of reduced token usage but also in the associated cost savings, with System 100 achieving significant reductions in operational costs. Moreover, FIG. 14 highlights the system's scalability and precision in handling queries, emphasizing the sustainable operation achievable on computational hardware with less capacity, thereby aligning with the objectives of energy conservation and economic hardware deployment.

Contrasting with FIG. 14, FIG. 15 delineates the process flow of a prior art system employing a non-hierarchical context shift. The figure indicates a model configuration denoted as GPT-4-32K, which is indicative of a model capable of interpreting prompts up to 32,000 tokens. Although the more extensive input capability allows for broader context consideration in a single query, it necessitates a substantially higher level of computational resources, as reflected in the increased token count and associated costs. Consequently, the prior art system depicted in FIG. 15 requires more robust and thus more costly computational hardware, resulting in a less energy-efficient operation. FIG. 15 serves to establish a benchmark for the advancements embodied in System 100, illustrating the potential inefficiencies and higher operational costs that the novel system successfully mitigates.

In sum, FIG. 14 and FIG. 15 provide a comparative visual and analytical narrative that underscores the advancements of System 100. FIG. 14 and FIG. 15 collectively convey the nuanced improvements in computational efficiency, the tangible benefits of cost savings, and the environmental advantages of the proposed system.

System 100 thus employs a hierarchical model of contextualization object 1200 and objects 1204 that improves classification precision without encountering the prompt size limitations typical in standard large language models. This hierarchical structure allows for the implementation of multiple levels of contextualization objects, including sub-contextualization objects (and potential for sub-sub contextualization objects, and deeper levels), thereby creating a robust tree. Each level can focus on increasingly specific categories, beginning with general topics, (air search, air policy, etc.) and becoming increasingly specific (flight cards, events) which can be refined further as needed.

System 100 allows for extensive scalability and flexibility in managing complex queries but also improves the overall efficiency, by reducing the number of tokens required for each classification by narrowing the focus at each level of the hierarchy, thereby decreasing the computational load and increasing the response speed. This method allows for each query to be handled more effectively, with a systematic narrowing down that avoids the broad sweep of general classifiers. The ability to maintain a large classifier structure, while focusing on detailed topics, enhances the system's capability to deliver precise and contextually appropriate responses.

An incidental benefit is that the hierarchical contextualization objects also introduces significant cost savings by optimizing the number of tokens required to process queries. Prior art systems may require a larger, more expensive model to handle extensive prompts in a single request. In contrast, our system efficiently distributes the load across several smaller requests, each tailored to a specific part of the classifier tree. This approach is illustrated by the substantial cost reductions observed, where the cost for an AIR_SEARCH request, for example, is reduced from $0.45 to $0.108, representing a savings of approximately 76%.

This cost-effectiveness is further highlighted by the practical limitations of token capacities in various GPT models. For instance, the inventors' examples demonstrate that a GPT-4 model with a 32K token capacity is required in prior art. System 100, utilizing a 4K model, avoids this issue by efficiently managing the token distribution across multiple classifiers, thus not only saving costs but also enhancing scalability and adaptability to complex queries.

In view of the above it will now be apparent that variations, combinations, and/or subsets of the foregoing embodiments are contemplated. For example, collaboration platform 104 may be obviated or its function distributed throughout a variant on system 100, by incorporating collaboration platform 104 directly inside LLM engine 120. Furthermore, the present specification is readily extensible into metaverse environments, where devices 116 include virtual or augmented reality hardware and operate avatars within a metaverse platform. The metaverse platform can host virtual travel agents in the form of metaverse avatars, whose speech is driven by the teachings herein. The teachings herein can also be incorporated into physical robots that operate according to the teachings herein. While the present embodiments refer to travel searches, broader e-commerce searches can also be effected in variants, such as for cellular telephone plans, vehicle purchases, home purchases, whereby user messages containing unstructured search requests are received and an LLM engine is used to flesh out the search parameters and generate structured search requests which can then be passed to e-commerce search engines, and the returned results can replace the structured search request in the final result returned to the user.

In other variants, collaboration platform 104 need not provide collaboration or other communication services between users 124, and thus collaboration platform 104 can simply be substituted with a chatbot platform that is used to fulfill the travel search dialogue with a given user 124 according to the teachings herein. Collaboration platform 104 can be incorporated into the LLM Engine 120.

In another variant, the present teachings are applicable to search engines beyond travel. For example, in the application of a home renovation, the general contextualization object can classify queries into materials, labor, delivery schedule, and other or general. The specific contextualization objects can be respective to different search engines for home renovation materials (e.g. building supplies, bathroom fixtures, kitchen fixtures, plumbing, electrical), and for labor (e.g. carpenters, plumbers, electricians) and for delivery services (e.g. courier companies, trucking companies, customs brokers, logistic handlers). The natural conversation with LLM engine 120 can be effected using reduced tokens and thereby allow for more complex conversations, and appropriate responses. Generally, the present specification can facilitate coordination among a variety of different search engine sources through a single LLM engine, thereby providing a natural language conversation environment that is more efficient and has a reduced likelihood of producing hallucinations.

In another variant, machine learning feedback can be used to further improve the context shifts and/or train the LLM Engine 120 in providing its dialogue with the user 124. The conversations between been users 124 and LLM Engine 120 can be archived and fed into a machine learning studio platform. The studio allows to train a machine learning algorithm. The machine learning algorithm, can for example, generate a new version of the orchestrator prompt engineering from Table 228-1, or any of the other Tables 228. Then the updated model can deployed into method 300 via an application via a workflow from the machine learning studio platform to LLM Engine 120.

Accordingly, in this variant, one or more of the applications 224 may include the machine learning studio platform with any desired related machine learning deep-learning based algorithms and/or neural networks, and the like, which are trained to improve the Tables in method 300. (Hereafter machine learning applications 224). Furthermore, in these examples, the machine learning applications 224 may be operated by the processor 208 in a training mode to train the machine learning and/or deep-learning based algorithms and/or neural networks of the machine learning applications 224 in accordance with the teachings herein.

The one or more machine-learning algorithms and/or deep learning algorithms and/or neural networks of the machine learning applications 224 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms; reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like.

A person skilled in the art will now appreciate that the teachings herein can improve the technological efficiency and computational and communication resource utilization across system 100 by making more efficient use of network and processing resources in system 100, as well as more efficient use of transportation actors 224-1. For example, present large language models (LLM) cannot provide real time travel search because they are trained and rely upon on a static dataset that is periodically updated. Enabling real-time access to the internet is generally incompatible with the static nature of large language model datasets, and different architecture and continuous updating, which would be computationally expensive and challenging to manage. At the same time, existing chat functionality does not address the problem of collecting rich and structured travel queries that can be used to provide meaningful searches. It should now also be apparent that LLM Engine 120 can be used as a natural language processing (NLP) engine for system 100 and its variants.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method for real-time search comprising:

configuring a large language model (LLM) engine with a context shift using a plurality of specific contextualization objects within a hierarchy chained in a tree structure, the hierarchy being dependent from a general contextualization object;

receiving, at a natural language processing (NLP) engine, an input message;

forwarding the input message from a collaboration platform to the LLM engine;

determining, at the LLM engine, that the input message includes an unstructured query corresponding to one of the specific contextualization objects based on the general context shift and the unstructured query by traversing only one of the branches of the tree structure that is associated therewith, wherein a number of tokens in the determining being less than if the determining is based on a non-hierarchical contextualization object;

preparing, at the LLM engine, a draft response message including a structured query to at least one of a plurality of search engines corresponding to the one of the specific contextualization objects;

forwarding the draft response message from the LLM engine to the collaboration platform;

sending the structured query from the collaboration platform to a management engine for routing and processing by the at least one of a plurality of search engines;

receiving, at the collaboration platform, a response to the structured query, from the search engine via the management engine;

generating an output message responsive to the input message including the draft response message that substitutes the response for the structured query; and, processing a subsequent unstructured query that builds on the response, wherein a different specific contextualization object chained within the hierarchy is chosen for the subsequent query than for the initial unstructured query, the choosing including traversing a different branch of the tree structure, and wherein a number of tokens in the processing is less than if the processing is based on a non-hierarchical contextualization object.

2. The method of claim 1 wherein the general contextualization object is based on home renovation planning and configures the LLM engine to classify the unstructured query into at least one of a materials query, a labour query, a delivery query and a general query.

3. The method of claim 1 wherein the general contextualization object is based on travel searching and configures the LLM engine to classify the unstructured query into at least one of an air-search query, an air-policy query, a general query, an events query and a ground transportation itinerary search query; each of the queries corresponding to one or more of the search engines.

4. The method of claim 3 wherein a subsequent unstructured query builds on a previous response; and wherein a different specific contextualization object is chosen for the subsequent query than for the original unstructured query.

5. The method of claim 3 wherein the real-time search is a travel query and the search engines are travel actor engines; the travel query includes a transportation-actor component and a hospitality-actor component and the transportation-actor component is respective to at least one travel actor engine and the hospitality-actor component is respective to another at least one travel actor engine.

6. The method of claim 5 wherein the travel query includes a transportation-actor component that is restricted by an employer policy component.

7. The method of claim 6 wherein the employer policy component corresponds to an employer policy search engine that maintains restrictions as to types of queries to the at least one travel actor engine respective to the transportation-actor component and the at least one travel actor engine respective to the hospitality-actor component, and wherein the restrictions are based on an account from which the input message originates.

8. The method of claim 3 wherein the real-time search is a travel query, and wherein the travel query requires a coordination between travel-actors such that the results are responsively filtered by the coordination.

9. The method of claim 8 wherein the coordination is based on aligning a flight schedule with an availability of a ground-transportation service and accommodation.

10. The method of claim 3 wherein the real-time search is a travel query, and wherein the travel query includes one or more travel-actors including: transportation- actors including airlines, rail services, bus lines and ferry lines; hospitality-actors including hotels, resorts and bed and breakfasts; for-hire ground-transportation actors including car-rentals, taxis and car sharing; and dining-actors including restaurants, bistros and bars.

11. The method of claim 1 wherein the input message and output message are incorporated into a collaboration tool executing on a collaboration platform that hosts the NLP engine.

12. The method of claim 11 wherein the collaboration tool is a social media platform.

13. The method of claim 11 wherein the real-time search is a travel query, and wherein the travel query includes an account profile of a user generating the input message.

14. A collaboration platform including a real time network search function based on natural language processing queries; the platform including a processor and a memory; the processor executing programming instructions for:

configuring a large language model (LLM) engine with a context shift using a plurality of specific contextualization objects within a hierarchy chained in a tree structure, the hierarchy being dependent from a general contextualization object;

receiving, at a natural language processing (NLP) engine, an input message;

forwarding the input message from the collaboration platform to the LLM engine;

determining, at the LLM engine, that the input message includes an unstructured query corresponding to one of the specific contextualization objects based on the general context shift and the unstructured query by traversing only one of the branches of the tree structure that is associated therewith, wherein a number of tokens in the determining being less than if the determining is based on a non-hierarchical contextualization object;

preparing, at the LLM engine, a draft response message including a structured query to at least one of a plurality of search engines corresponding to the one of the specific contextualization objects;

forwarding the draft response message from the LLM engine to the collaboration platform;

sending the structured query from the collaboration platform to a management engine for routing and processing by the at least one of a plurality of search engines;

receiving, at the collaboration platform, a response to the structured query, from the search engine via the management engine;

generating an output message responsive to the input message including the draft response message that substitutes the response for the structured query; and, processing a subsequent unstructured query that builds on the response, wherein a different specific contextualization object chained within the hierarchy is chosen for the subsequent query than for the initial unstructured query, the choosing including traversing a different branch of the tree structure, and wherein a number of tokens in the processing is less than if the processing is based on a non-hierarchical contextualization object.

15. The collaboration platform of claim 14 wherein the management engine is incorporated into the collaboration platform.

16. The collaboration platform of claim 14 wherein the LLM engine is incorporated into the collaboration platform.

17. The collaboration platform of claim 14 wherein the NLP engine is incorporated into the collaboration platform.

18. The collaboration platform of claim 14 wherein the NLP engine and LLM engine are combined into a single engine.

* * * * *